US006246417B1

(12) United States Patent
Kambe et al.

(10) Patent No.: US 6,246,417 B1
(45) Date of Patent: Jun. 12, 2001

(54) MAP EDITING APPARATUS ENABLING SIMPLIFIED EDITING THROUGH PROVISION OF USER-SELECTABLE AUTOMATIC EDITING FUNCTIONS

(75) Inventors: Nobuhiro Kambe, Tokyo; Akihiro Abe, Yokohama; Takanori Shimada; Go Nakano, both of Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/118,066

(22) Filed: Jul. 17, 1998

(30) Foreign Application Priority Data

Sep. 24, 1997 (JP) .................................... 9-258128

(51) Int. Cl.[7] .................................................. G06K 9/00
(52) U.S. Cl. ......................... 345/433; 345/441; 345/442; 345/443; 382/113
(58) Field of Search ................................. 345/433, 429, 345/443, 442, 441; 364/512; 395/326

(56) References Cited

U.S. PATENT DOCUMENTS

| | | | |
|---|---|---|---|
| 4,737,927 | * 4/1988 | Hanabusa et al. | 364/443 |
| 4,891,761 | * 1/1990 | Gray et al. | 364/452 |
| 5,150,295 | * 9/1992 | Mattingly | 364/420 |
| 5,329,464 | * 7/1994 | Sumic et al. | 364/512 |
| 5,448,696 | * 9/1995 | Shimada et al. | 395/161 |
| 5,469,536 | * 11/1995 | Blank | 395/131 |
| 5,509,113 | * 4/1996 | Takakura et al. | 395/142 |
| 5,546,107 | * 8/1996 | Deretsky et al. | 395/600 |
| 5,638,523 | * 6/1997 | Mullet et al. | 395/326 |
| 5,864,632 | * 1/1999 | Ogawa et al. | 382/113 |
| 5,917,436 | * 6/1999 | Endo et al. | 340/995 |
| 6,012,014 | * 1/2000 | Koyanagi et al. | 701/208 |

FOREIGN PATENT DOCUMENTS

| | | |
|---|---|---|
| 0 609 030 | 8/1994 | (EP) . |
| 6-60136 | 3/1994 | (JP) . |
| 8-77380 | 3/1996 | (JP) . |

OTHER PUBLICATIONS

Zinser K et al: "Fisheye Views–Making Complex Systems Manageable Through Selectivepresentation of Information" ABB Review, No. 3, Jan. 1, 1995, pp. 10–15, XP000510173.
Jones C B: "Conflict Resolution in Cartographic Name Placement" Computer Aided Design, vol. 22, No. 3, Apr. 1, 1990, pp. 173–183, XP000142572.
Wataru Kameyama et al: "Separation and Storage Method for the Elements of Map Image and the Experimental System" Systems & Computers in Japan. vol. 19,No. 9, Sep. 1, 1988,pp. 77–90,XP000120490.

* cited by examiner

*Primary Examiner*—Matthew Luu
*Assistant Examiner*—Daniel J Chung
(74) *Attorney, Agent, or Firm*—Israel Gopstein

(57) ABSTRACT

A map editing apparatus is provided with various sections having respective editing functions which can be selectively specified for operating on one or more user-selected elements of a displayed map, with each editing function serving to automatically execute a specific editing operation, which may utilize one or more predetermined parameters. The apparatus includes a conformity management section having a function for detecting when execution of an editing operation will result in nonconformity in the map, such as mutual overlapping of map elements, and for automatically causing such an editing operation to be executed in a modified form, such as to prevent occurrence of the nonconformity.

32 Claims, 39 Drawing Sheets

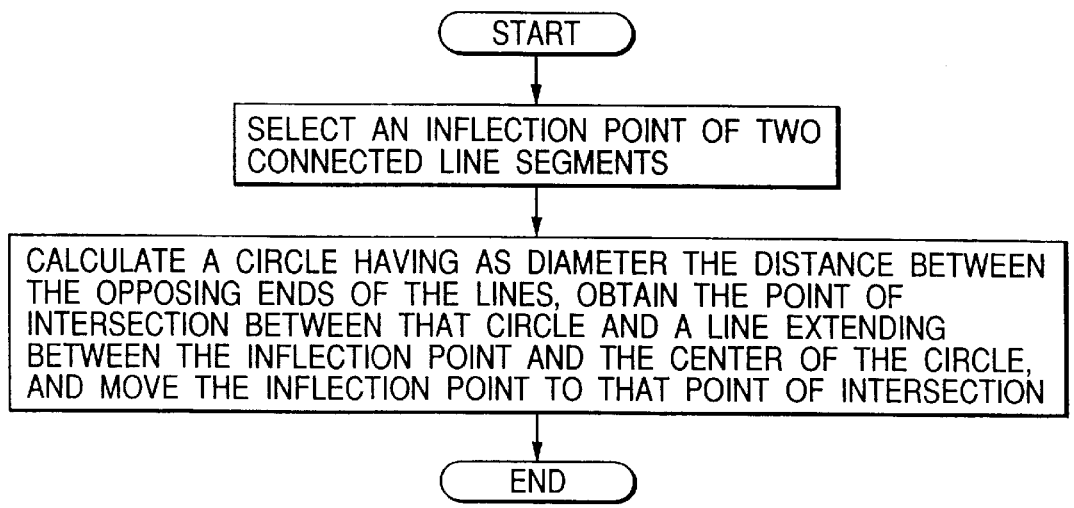
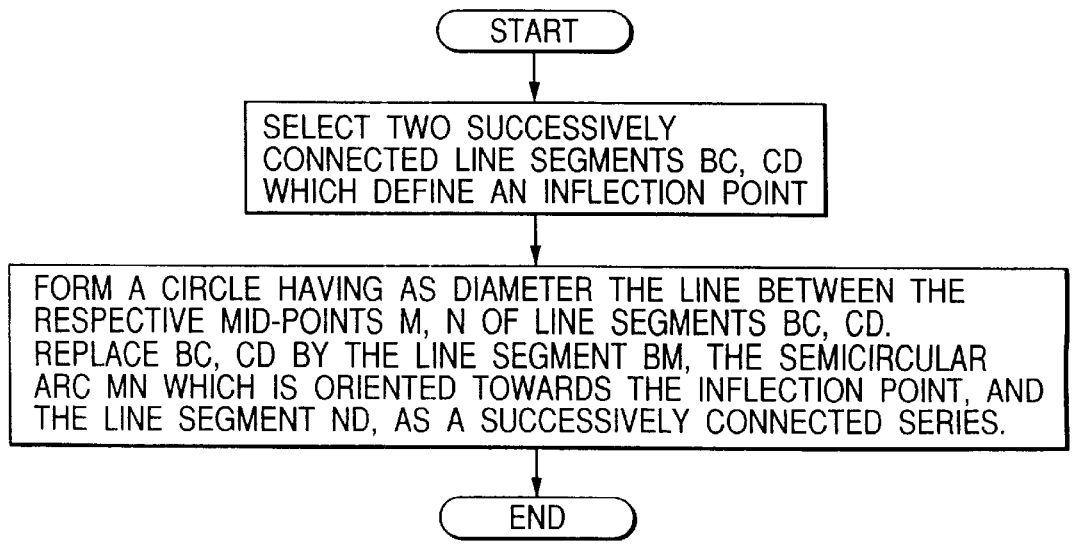

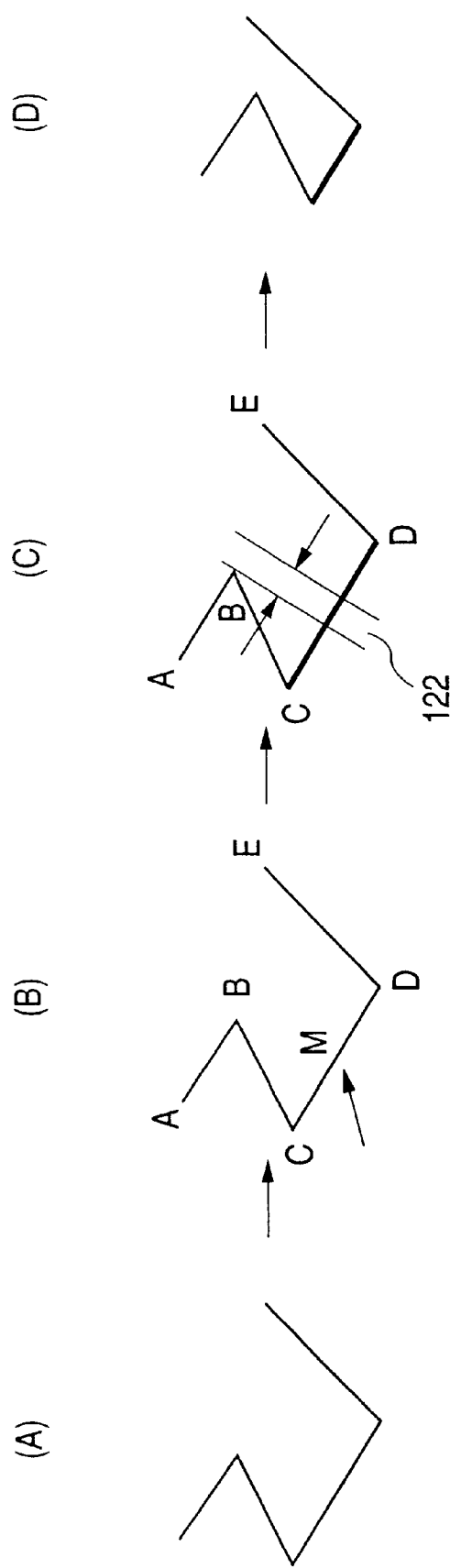

FIG. 32
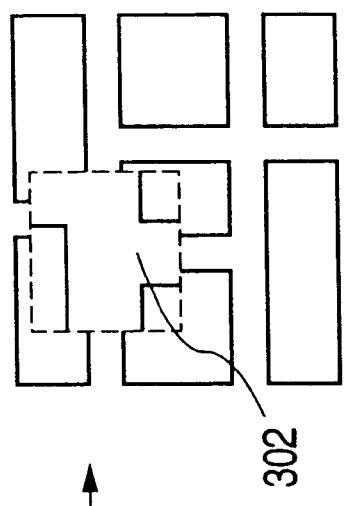
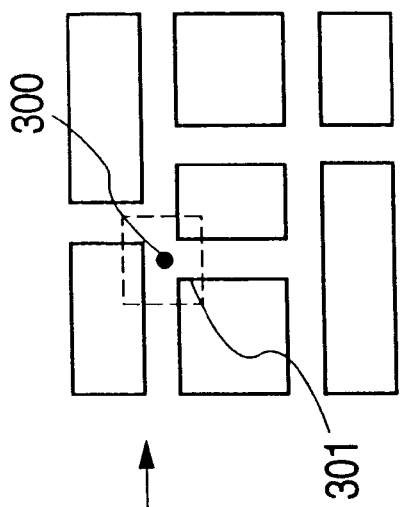
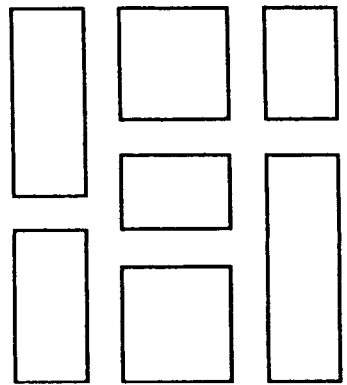

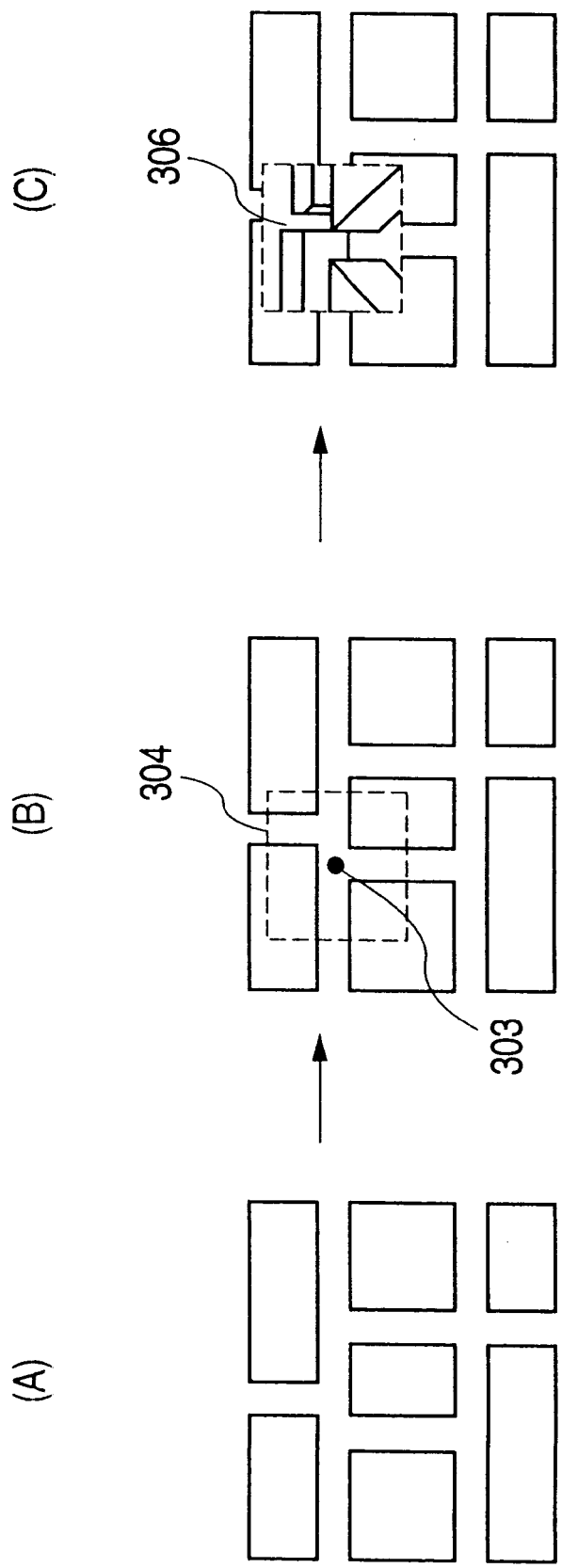

MAP EDITING APPARATUS ENABLING SIMPLIFIED EDITING THROUGH PROVISION OF USER-SELECTABLE AUTOMATIC EDITING FUNCTIONS

BACKGROUND OF THE INVENTION

1. Field of the Invention

The present invention relates to a map editing apparatus which facilitates editing of a map for a purpose such as generating a simplified map, while ensuring that predetermined position relationships within the map are preserved.

2. Description of the Prior Art

In the field of map editing, it is generally necessary that maps which result from such editing are detailed and accurate. In the case of map editing tools which are intended for general-purpose use, almost no functions are provided for actually editing maps themselves. However tools having some editing functions (such as the ⅔ dimension mapping system which has been developed by the Industrial Institute for Information Processing Advancement in Japan) have been produced.

Technology for a map editing apparatus which is capable of being switched between CAD (Computer-Aided Design) functions and attribute alteration functions has been disclosed in Japanese patent HEI 6-60136. With that apparatus, the editing functions utilize the same functions as those employed in CAD. Also, in Japanese patent HEI 8-77380, a system is described whereby degrees of priority are assigned to the constituent elements of a map in accordance with the strengths of their links to actual objects. When a map editing operation such as rotation processing is to be applied, with a plurality of map elements in the selected condition, alterations are applied in order from the elements having the lowest priority.

With prior art technology for map editing, the objective is usually to enable correction of the map data to be performed for the purpose of providing greater accuracy in the map. To some extent, the functions which are used as tools for CAD may be applied to such editing. However in the case of a map, it is also necessary to consider the question of maintaining conformity of certain position relationships within the map, when performing editing.

Furthermore in the case of a prior art technique whereby priority levels are assigned to the map elements, such that operations to change the shape of one element will result in linked changes in other elements, it is not always possible for a user to perform changes in shape within the map in accordance with the user's requirements.

Moreover there is a requirement for a capability whereby maps can be generated which, rather than being highly accurate and detailed, have been edited in such a way as to be made convenient to use and easily understandable. This can be achieved for example by emphasizing certain items of important information within the map and through the elimination of information which is not important, while leaving the accuracy of the map maintained at a certain level. Such types of map are generally designed by using conventional illustrator techniques. For that reason, such maps cannot be easily produced by an inexperienced person.

Furthermore, there is no map editing apparatus available which enables a user to specify that a special view of a particular small region in a map, such as a small picture providing an enlarged view or a birds-eye view of such a region, is to be automatically set into the map.

SUMMARY OF THE INVENTION

In order to overcome the above problems, it is an objective of the present invention to provide functions for facilitating the editing of data expressing a map, with the functions being selectively activated by a user while observing a display of the map. The apparatus is basically applicable to data expressing a map in which respective map elements such as street blocks, public buildings, etc., are expressed as respective sets of successively connected straight line segments (referred to in the following simply as line segments), with streets being defined between such map elements. The map elements may also include lines representing respective railroad lines, and dots, symbols or character strings which indicate special features such as public buildings, landmarks etc.

The editing functions of the apparatus include a capability for performing editing (referred to in the following and in the appended claims as transformation editing) which results in displacement, angular rotation, or shortening of respective selected line segments (e.g., selected in the displayed map by use of a usual type of computer input device such as a mouse), and also for arranging a pair of selected connected line segments to meet at a right angle, forming a pair of connected line segments with respective curvature such as to meet along a curved line, arranging a plurality of non-connected line segments in parallel, arranging a plurality of successively connected line segments along a straight line. In addition, such transformation editing functions include a capability for combining a selected plurality of map elements such as street blocks into a single element, for the purpose of simplifying the map.

The characterizing features of the present invention are that:

(a) such transformation editing operations, once specified by the user, are executed automatically in accordance with predetermined parameters. For example, line shortening occurs through shortening of a selected line segment by a predetermined proportion of its length, and (b) each time that execution of such a transformation editing operation is specified by the user, the apparatus detects whether that operation will have the effect of causing a predetermined form of nonconformity in the map, such as overlapping between respective map elements. In such a case, the map editing apparatus automatically modifies a parameter of that transformation editing operation (for example, by reducing the proportion by which a line segment will be shortened), and repeats such modifications if necessary until it becomes possible to execute the specified editing operation without the occurrence of nonconformity. The apparatus thereby automatically maintains conformity of predetermined position relationships within the map.

In addition the invention provides functions whereby, when the user selects a pair of mutually adjacent line segments, the spacing between these line segments can be automatically increased or decreased by a predetermined proportion. If the line segments are constituent parts of opposing street blocks, i.e. with a street segment defined between the selected line segments, automatic widening or narrowing of such a street segment can thereby be easily performed, Such widening of a street serves to emphasize that street, as seen in the map.

The invention also provides functions for generating an expanded picture, a birds-eye view picture or an original picture, of a region surrounding a user-specified ground point on a map and for then setting the resultant picture into the map. Such an expanded picture, birds-eye view picture or original picture can be set into the map at a location which is centered on the original ground point for that picture, or at a different location which is centered on a ground point that is selected by the user. In the latter case, the apparatus will automatically generate an indication line (referred to in the following as an extraction line) pointing from the original location to the shifted location of the picture. The term "original picture" as used in the present specification and claims signifies a portion of a map which is being edited, taken in an original condition of that map, i.e. in a condition prior to executing any editing operations on that map by the apparatus of the present invention.

By providing the above functions, the present invention provides a map editing apparatus whereby a user can readily edit data expressing an existing map to produce a modified map which is easy to read, and whereby the user can set into the map considerable amounts of information, while maintaining conformity of predetermined position relationships within the map.

More specifically, according to a first aspect, the invention provides a map editing apparatus operable for generating a display image of a selected map and for editing the map, having map readout means for reading out map data expressing the map from an externally provided database, display means for displaying the map on an externally provided display apparatus, and input means for specifying elements to be selected in the map and for specifying editing operations which are to be applied to the selected elements, in response to input data and commands supplied from an externally provided input apparatus;

wherein the map editing apparatus comprises means operable for executing transformation editing operations on selected elements of the map and conformity management means having map conformity means for monitoring the effects of a transformation editing operation upon existing position relationships in the map, and for automatically modifying the transformation editing operation if necessary to prevent occurrence of nonconformity of the position relationships due to effects of the transformation editing operation.

The conformity management means preferably includes map conformity means for judging the effects of any transformation editing operation, to detect the occurrence of a predetermined type of nonconformity as a result of that editing operation, such as occurrence of mutual overlap between adjacent map elements, and to cause such an editing operation to be re-executed after modification of one or more parameters. Such judgement and editing modification operations are repeated if necessary, until a condition is reached where the editing operation will not cause the nonconformity to occur.

Such a map editing apparatus can comprise portion transformation means, for executing such transformation editing operations, including right angle alignment means operable for selecting two connected line segments and for automatically arranging the line segments to meet at a right angle.

Furthermore the portion transformation means of such a map editing apparatus can comprise curvature formation means operable for selecting a junction point of two connected line segments and for automatically effecting curvature of the line segments such that the line segments meet along a curved line.

In addition, the portion transformation means of such a map editing apparatus can comprise parallel alignment means operable for selecting two mutually adjacent line segments and for automatically arranging the line segments to be mutually parallel.

Also the portion transformation means of such a map editing apparatus can comprise line shortening means operable for selecting a single line segment and for automatically effecting shortening of the line segment by a predetermined proportion.

Moreover the portion transformation means of such a map editing apparatus can comprise straight line alignment means operable for selecting a plurality of successively connected line segments and for automatically arranging the line segments into a single straight line formed of all of the line segments.

In addition, the portion transformation means of such a map editing apparatus can comprise street emphasizing means operable for selecting two mutually adjacent line segments and for automatically increasing a distance between the line segments by a predetermined proportion, and street abridgement means operable for selecting two mutually adjacent line segments and for automatically reducing a distance between the line segments by a predetermined proportion.

According to another aspect, the invention provides a map editing apparatus operable for generating a display image of a selected map and for editing the map, having map readout means for reading out map data expressing the map from an externally provided database, display means for displaying the map on an externally provided display apparatus, and input means for specifying elements to be selected in the map and for specifying editing operations which are to be applied to the selected elements, in response to input data and commands supplied from an externally provided input apparatus, and comprising insertion picture generating means including expanded picture generating means operable for selecting an arbitrary ground point in the map and for automatically setting into the map an expanded-size picture of a portion of the map which surrounds the ground point within a specific range, the expanded-size picture being set into a location which is centered on the ground point. The range and the degree of expansion used to generate the expanded picture are each preferably predetermined, however it would also be possible to configure the apparatus such that a user can select arbitrary values for these parameters.

The insertion picture generating means may further include birds-eye view picture generating means operable for selecting an arbitrary ground point and for automatically setting into the map a birds-eye view picture of a portion of the map which surrounds that designated ground point within a specific range, the birds-eye view picture being set into a location which is centered on the ground point.

The range and the visual point which are used to generate the such a birds-eye view picture are each preferably predetermined, however it would also be possible to configure the apparatus such that a user can select arbitrary values for these parameters.

The insertion picture generating means may further include original picture generating means for selecting an arbitrary ground point, and for automatically setting into the displayed map an original picture of a portion of the map which surrounds that selected ground point within a specific range, (i.e. to set in a portion of an original unedited map corresponding to the ground point and range), with the original picture being set into a location which is centered on the ground point.

The value of range which is used to generate such an original picture is preferably predetermined, however it would also be possible to configure the apparatus such that a user can select an arbitrary value for the range.

The insertion picture generating means may further comprise extraction line generating means operable for selecting an insertion picture, a character string or a symbol in the map, for selecting an arbitrary ground point to which the selected insertion picture, character string or symbol is to be shifted, for automatically executing shifting of the selected insertion picture, character string or symbol from an initial location thereof to a shifted location which is centered on the arbitrary ground point, and for automatically generating an extraction line (i.e., an indication pointer line) extending from a point at the initial location to a point at the shifted location.

Such an extraction line is preferably generated such as to extend from an initial point which is located at the opposite side of the initial location from the shifted location, to a corresponding position of the initial point in the shifted location.

When a map editing apparatus according to the present invention includes the aforementioned street emphasizing means and street abridgement means, the apparatus may further comprise map shifting means operable when a shift operation has been executed by the street enhancement means or by the street abridgement means and when the selected pair of line segments are respective opposing constituent segments of two street blocks, for dividing all elements of the map other than the selected pair of line segments into a first set of elements which are located on a first side of a median line between the selected line segments and a second set of elements which are located on a second side of the median line, and for automatically shifting each of the first set of elements and the second set of elements by an amount and direction of shifting which are identical to those applied to a corresponding one of the selected pair of line segments, to thereby maintain conformity of position relationships throughout the map.

Also, when a map editing apparatus according to the present invention includes the aforementioned street emphasizing means and street abridgement means and when the selected pair of line segments are respective opposing constituent segments of two street blocks, the apparatus may further comprise map transformation means operable when a shift operation has been executed by the street emphasizing means or by the street abridgement means, for automatically compressing or expanding each of the two street blocks along a direction in which a constituent one of the pair of line segments has been shifted, such as to maintain conformity of position relationships in the map.

Such compression or expansion of a street block is preferably executed by holding one apex point of the street block as a fixed reference apex point while shifting remaining apex points of the street block by respective proportions which are determined in accordance with distance from the corresponding one of the selected pair of line segments, with the fixed reference apex point being selected as a farthest apex point from the corresponding one of the selected pair of line segments.

A map editing apparatus according to the present invention may also comprise street block aggregation means operable for selecting a plurality of street blocks and automatically combining the street blocks into a single street block.

Such street block aggregation means preferably comprises means for automatically defining a boundary line around the plurality of street blocks, with the single street block being configured to correspond to the boundary line.

A map editing apparatus according to the present invention may also comprise railroad line aggregation means operable for automatically combining into a single representative railroad line section a plurality of sections of respective railroad lines which are located in mutual proximity with a concentration which exceeds a predetermined degree.

By utilizing the street block aggregation means ad/or the railroad line aggregation means, it becomes possible to easily simplify a map, for greater legibility.

Furthermore a map editing apparatus according to the present invention can comprise portion transformation means operable for selectively executing a plurality of transformation editing operations upon elements of a map, wherein the conformity management means includes transformation confirmation means for maintaining a record of data expressing transformation operations applied to respective elements of the map by the portion transformation means, detecting a condition in which a newly specified transformation editing operation to be performed by the portion transformation means upon a map element will conflict with a previously executed transformation editing operation performed on the element, and when such a condition is detected, causing the display means to indicate, by the display apparatus, that such conflict will occur, and to display a result of executing the newly specified transformation editing operation.

Such transformation confirmation means is preferably configured such as to cause the display means to display, by the display apparatus, a request for selection of one of a plurality of different courses of action which may be taken, when the newly specified transformation editing operation for a map element is judged to conflict with a transformation editing operation previously executed on the map element.

These courses of action preferably comprise at least, in the case of an editing operation which is specified to be applied to a line segment:

holding one end of the line segment fixed in position, when a transformation editing operation is performed, or holding the length of the line segment fixed, when a transformation editing operation is performed, or holding a slope angle of the line segment fixed, when a transformation editing operation is performed, or holding the line segment in its current status, without executing a transformation editing operation which will affect that status, or freely executing a transformation editing operation, irrespective of effects upon the results of editing operations previously executed.

When the editing operation has been specified to be applied to a map element which is an apex point of a street block or is a position-indicating dot, the courses of action preferably comprise:

holding the map element in its current position and orientation, or freely executing a transformation editing operation, irrespective of effects upon the results of editing operations previously executed.

The actual effects of any transformation editing operation which is selected based on one of these courses of action are preferably monitored by the map conformity means and the transformation editing operation is automatically modified by the map conformity means, if necessary, to prevent occurrence of nonconformity in the map due to the transformation editing operation.

A map editing apparatus according to the present invention can thus be easily used by an inexperience individual to edit an existing map for a purpose such as generating a simplified map or a map containing large amounts of increased information (such as inserted expanded views of specific locations, etc.). This ease of use is ensured since it is only necessary for a user to select one or more map elements or ground points in a displayed map and to select one of the editing functions, to cause the apparatus to automatically execute an editing operation utilizing predetermined parameters.

BRIEF DESCRIPTION OF THE DRAWINGS

FIGS. 6A, 6B and 6C constitute an overall flow diagram of the processing executed by the map editing apparatus, in which FIG. 6A is a basic flow diagram of the processing which is executed by the portion transformation section, FIG. 6B is a flow diagram of processing which is executed by the aggregation section and of processing which is executed by the insertion picture generating section, and FIG. 6C is a basic flow diagram of processing which is executed by the conformity management section;

FIG. 9 is a basic flow diagram of the processing which is executed by the right angle alignment section;

FIG. 11 is a basic flow diagram of the processing which is executed by the curvature formation section;

FIG. 14 illustrates, based on a portion of a displayed map, the effects of processing which is executed by a line shortening section, for shortening a selected line segment to a predetermined degree;

FIG. 32 illustrates, based on a portion of a displayed map, the effects of processing which is executed by an expanded picture generating section of the insertion picture generating section, whereby an expanded picture corresponding to a selected ground point is inserted into the map;

FIG. 34 illustrates, based on a portion of a displayed map, the effects of processing which is executed by a birds-eye view picture generating section of the insertion picture generating section, whereby a birds-eye view picture corresponding to a selected ground point is inserted into the map;

DESCRIPTION OF PREFERRED EMBODIMENTS

Figure 1:
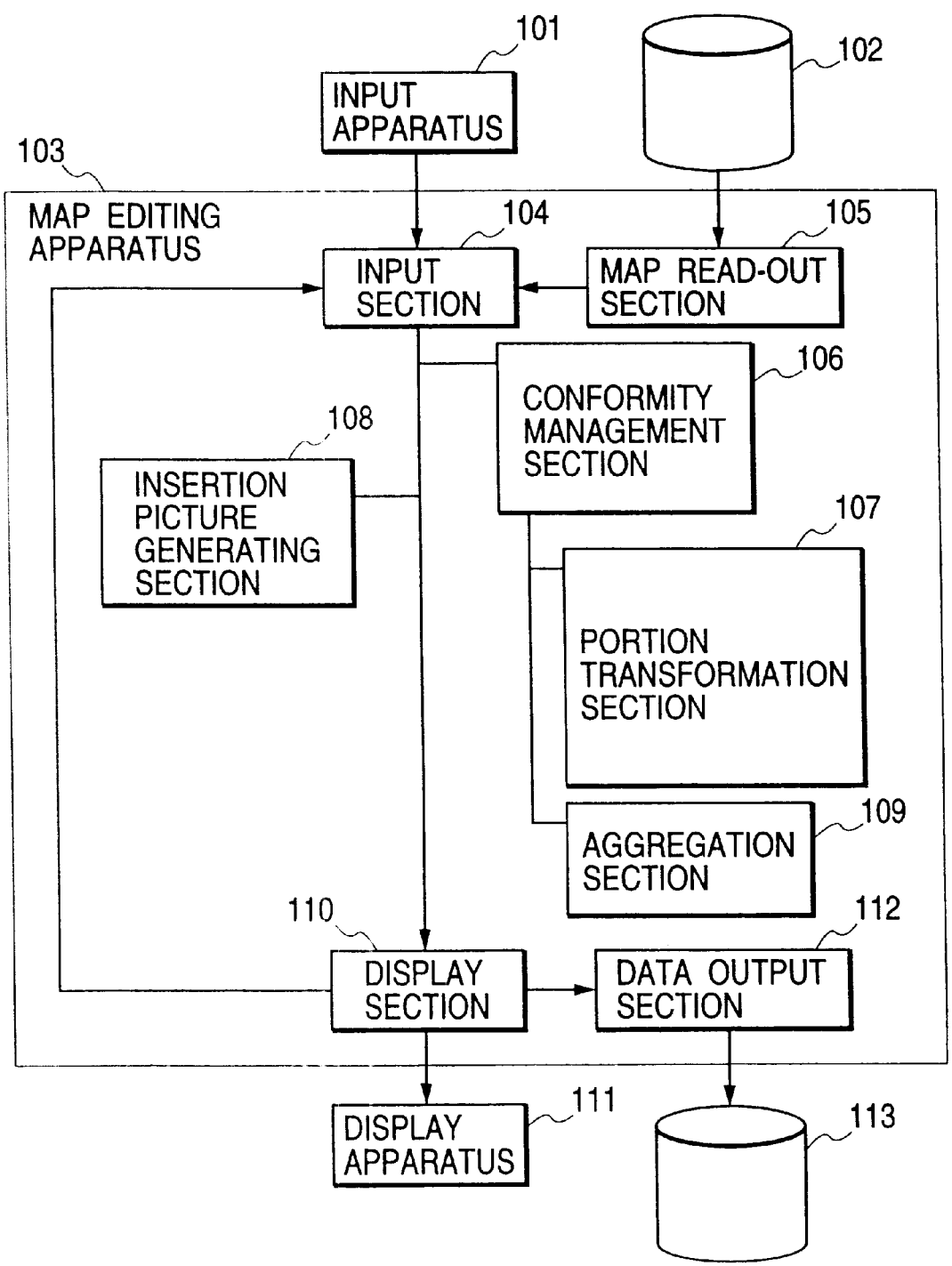
FIG. 1 is a general system block diagram of an embodiment of a map editing apparatus according to the present invention, with associated peripheral equipment.

Embodiments of the invention will be described in the following, referring to the drawings. In the following description and in the appended claims, the term "element" of a map has the general significance of any basic constituent element of the map, such as line segments which constitute street blocks, apex points of street blocks, dots which indicate the positions of landmarks, or character strings or symbols which identify landmarks or public buildings. In addition, the term "street block" is used as a general term for any map figure which is formed of a closed set of connected line segments. A public building or other landmark (referred to in general in the following as an "institution") may be indicated on the map by a superimposed dot or a superimposed or adjacently located character string or symbol. The term "apex point" signifies a corner point of a street block. The term "transformation editing" as used herein refers to any form of editing processing which results in shifting, changing the length, or angular rotation of a line segment, or in forming line segments with a curvature, or arranging line segments to meet at a right angle, or to become mutually parallel, or combining any plurality of map elements into a combined element.

FIG. 1 shows the general configuration of an embodiment of the invention, formed of a map editing apparatus 103 together with requisite peripheral equipment consisting of an input apparatus 101, a map database 102, a display apparatus 111 and a map data storage device 113, while FIGS. 2, 3, 4 and 5 show constituent internal sections of a conformity management section 106, an insertion picture generating section 108, a portion transformation section 107 and an aggregation section 109 respectively of the map editing apparatus 103. In a practical apparatus, with the map editing apparatus 103 implemented as a digital computer system, the respective functions of these sections are implemented by processing which is executed by corresponding program routines. The input apparatus 101 includes a data input device such as a keyboard, mouse, etc., and is operated by a user to select processing which is to be executed, and to specify respective constituent elements such as line segments which are to be the object of that processing. Inputs thereby supplied via the input apparatus 101 are received by an input section 104. A map database 102 stores data for a plurality of original maps (that is to say, maps in a form in which they have not been subjected to editing by the map editing apparatus) i.e., data expressing respective street blocks and data concerning individually identified map elements such a public buildings, etc. The data stored in the map database 102 can be selectively read out, in response to input commands supplied from the input apparatus 101, by a map read-out section 105, and supplied to the input section 104.

Figure 2:
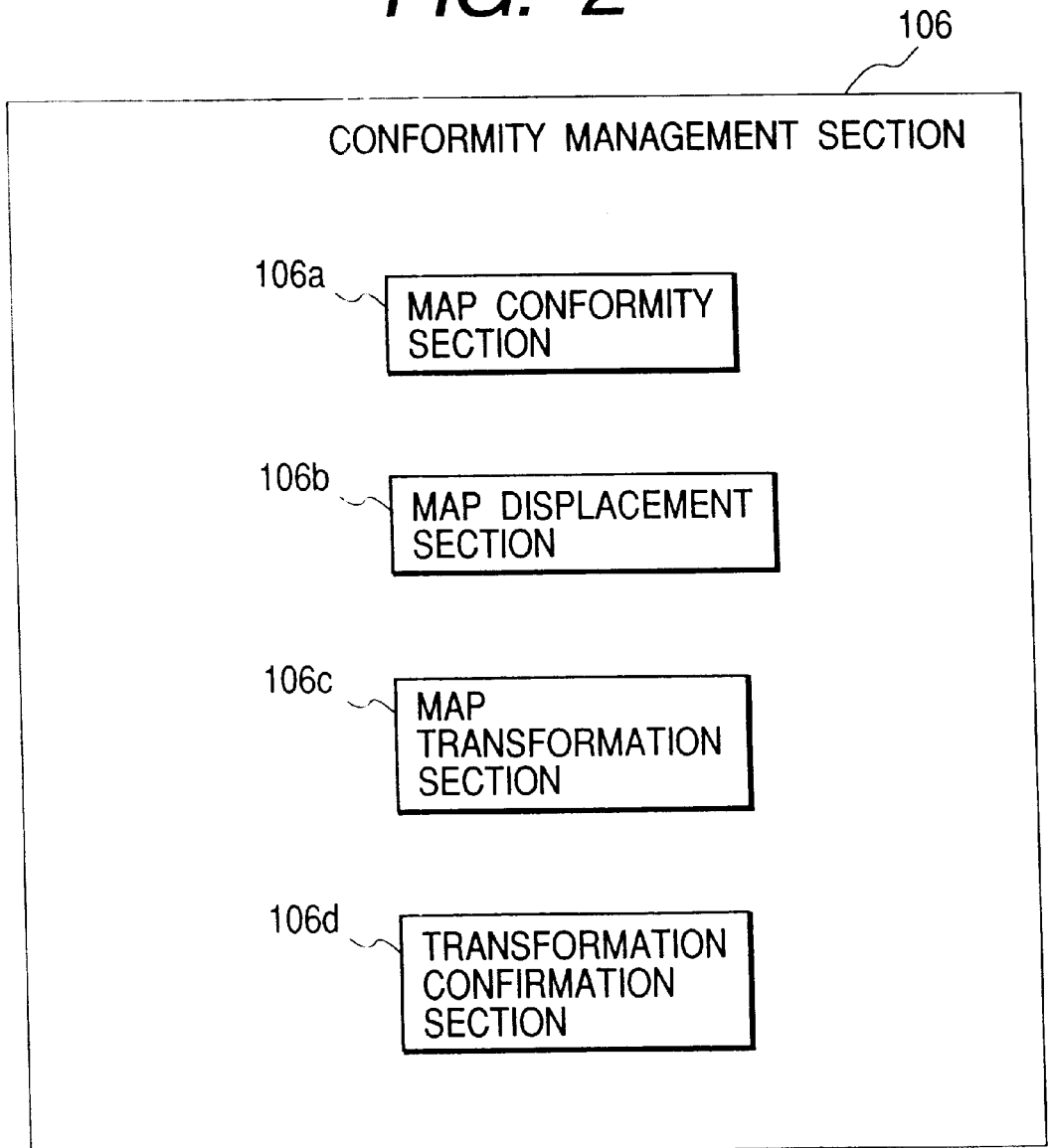
FIG. 2 is a conceptual block diagram for illustrating internal sections of a conformity management section of the embodiment of FIG. 1.

As shown in FIG. 2, the conformity management section 106 of the map editing apparatus 103 includes a map conformity section 106a, which serves to automatically limit the degree of changes which can be made in the position relationships of map elements as a result of any transformation editing processing, as defined hereinabove. Specifically, the map conformity section 106a serves to detect when execution of such a transformation editing operation will result in an occurrence of nonconformity of position relationships in a map, such as mutual overlapping of map elements. When it is detected that such a condition will result from an editing operation that has been specified by the user, the map conformity section 106a causes the processing for that editing operation to be re-executed in a modified form, i.e. modified such as to reduce the probability of nonconformity occurring as a result of that operation (for example, by changing the value of a parameter such as the proportion by which a line segment is shortened or by which a spacing between two line segments is increased).

The map conformity section 106a then again judges whether nonconformity will result. Such operations are repeated, if necessary, until a condition is reached at which the specified editing operation can be executed without resulting in occurrence of nonconformity in the map.

The conformity management section 106 further includes a map displacement section 106b, a map transformation section 106c and a map displacement section 106b, whose respective functions will be described in detail in the following.

Figure 4:
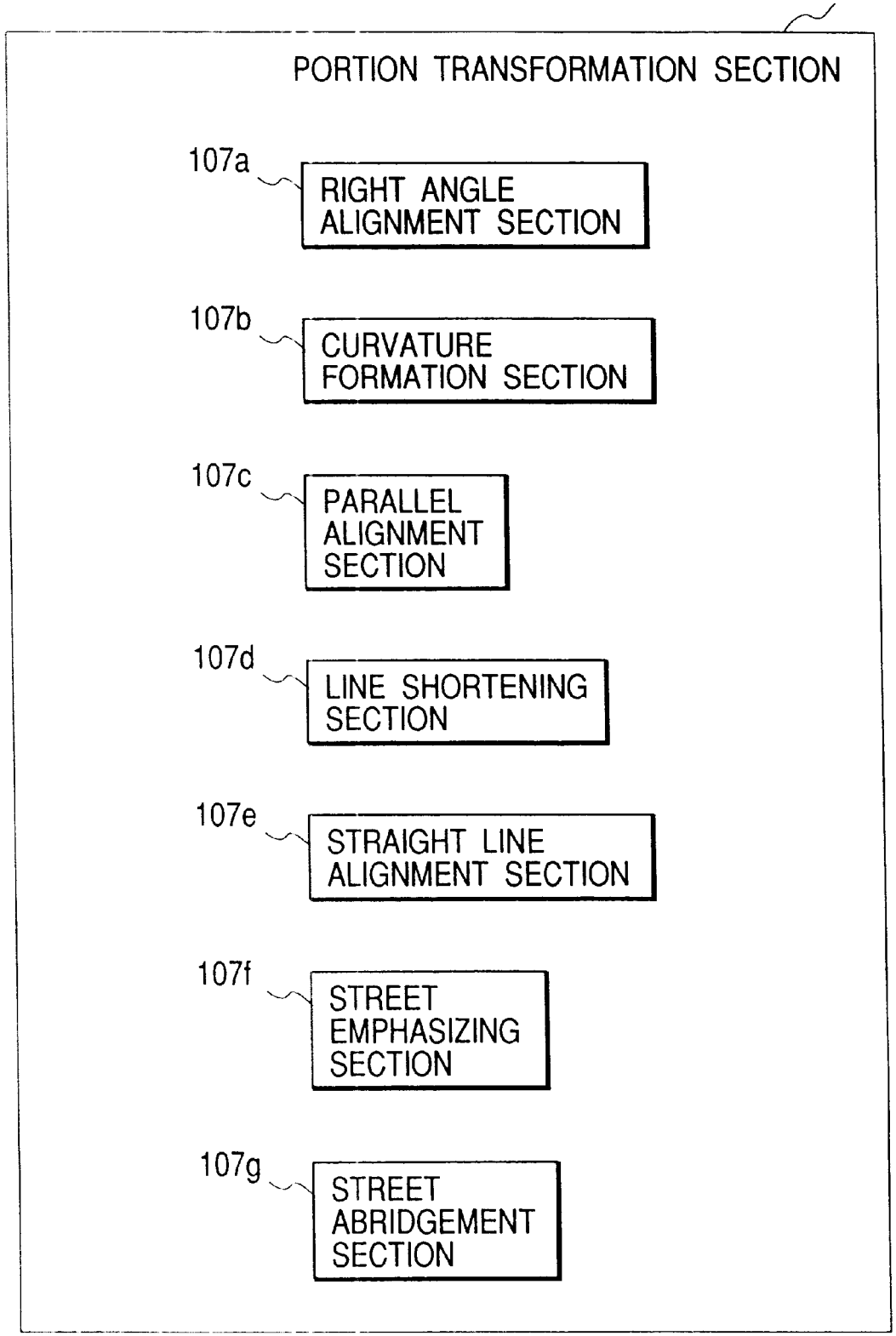
FIG. 4 is a conceptual block diagram for illustrating internal sections of a portion transformation section of the embodiment of FIG. 1.

As shown in FIG. 4, the portion transformation section 107 includes a right angle junction section 107a, a curvature formation section 107b, a parallel alignment section 107c, a line shortening section 107d, a straight line alignment section 107e, a street emphasizing section 107f and a street abridgement section 107g. The right angle alignment section 107a has the function of operating on two connected line segments which have been selected by the user (e.g., by "clicking" on the corresponding locations in the displayed map, using a switch of a mouse which forms part of the input apparatus 101), such as to automatically arrange the selected line segments to meet at a right angle.

The curvature formation section 107b has the function of operating on two connected line segments which have been selected by the user, such as to automatically form the line segments with curvature whereby these meet along a curved line which is oriented towards the original junction point of the two line segments.

The parallel alignment section 107c has the function of operating on two line segments which are not mutually connected and have been selected by the user, such as to automatically arrange these line segments to be mutually parallel.

The line shortening section 107d has the function of operating on a line segment which has been selected by the user, to automatically shorten the selected line segment by a predetermined proportion of its initial length.

The line shortening section 107d has the function of operating on a plurality of successively connected line segments which have been selected by the user, such as to automatically replace the selected plurality of line segments by a single straight line, (or by an approximation to a straight line, if the map conformity section 106a detects that conversion to a completely straight line will result in nonconformity of position relationships in the map, as described hereinafter).

The street emphasizing section 107f has the function of operating on a pair of line segments which are mutually adjacent, for example line segments which form opposing segments of two opposing street blocks, and which have been selected by the user, to automatically increase the spacing between the line segments by a predetermined proportion of the current spacing. If a street segment is formed between the selected line segments, then that street segment will thereby be emphasized in the displayed map The street abridgement section 107g has the function of operating on a pair of line segments which are mutually adjacent, for example line segments which form opposing segments of two opposing street blocks, and which have been selected by the user, to automatically decrease the spacing between the line segments by a predetermined proportion of the current spacing. If a street segment is formed between the selected line segments, then that street segment will thereby be made narrower.

When either the street emphasizing section 107f or the street abridgement section 107g is used to modify a segment of a street, the apparatus enters a condition in which the user can select processing to be executed by the map transformation section 106c or the transformation confirmation section 106d of the conformity management section 106. This processing has the effect of maintaining certain existing position relationships in the map, in spite of the changes which have been caused by the use of the street emphasizing section 107f or the street abridgement section 107g, as described in detail hereinafter referring to the drawings.

Figure 3:
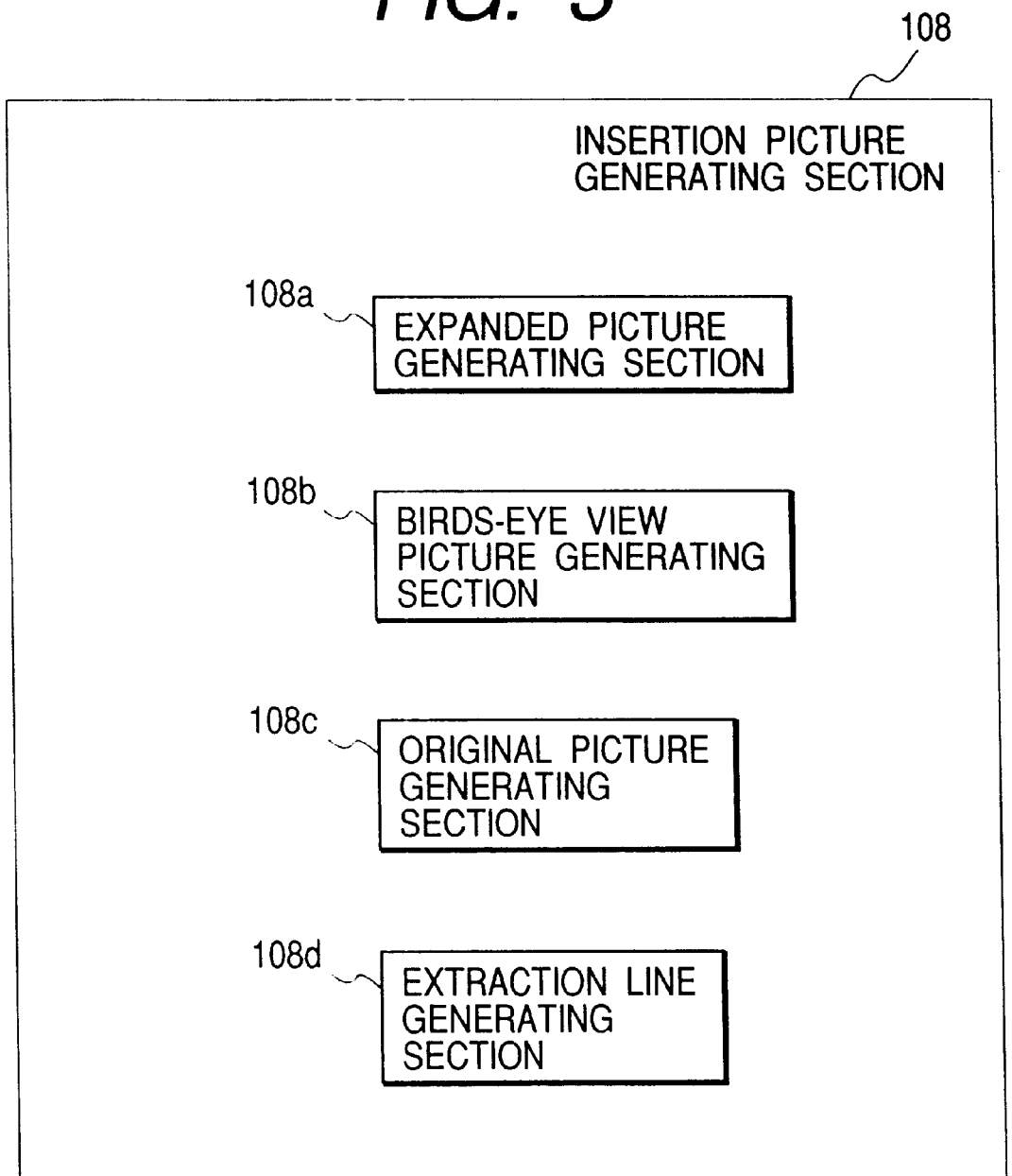
FIG. 3 is a conceptual block diagram for illustrating internal sections of an insertion picture generating section of the embodiment of FIG. 1.

As shown in FIG. 3, the insertion picture generating section 108 consists of an expanded picture generating section 108a, a birds-eye view picture generating section 108b, an original picture generating section 108c and an extraction line generating section 108d. The expanded picture generating section 108a enables the user to select an arbitrary ground point on a displayed map, and to designate that an expanded picture of a region (of predetermined range) surrounding that ground point is to be set into the map, in a location centered on the selected ground point.

The birds-eye view picture generating section 108b enables the user to select an arbitrary ground point on a displayed map, and to designate that a birds-eye view picture of a region surrounding that ground point (i.e., a region of predetermined range, with the birds-eye view picture taken from a predetermined visual point with respect to the selected ground point) is to be set into the map, in a location centered on the selected ground point.

The original picture generating section 108c enables the user to select an arbitrary ground point on a displayed map, and to designate that an original picture of a region surrounding that ground point, with a predetermined range, is to be set into the map at that point. That is to say, a corresponding undedited portion of an original map is to be set into the map which is being edited, in a location centered on the selected ground point.

The extraction line generating section 108d enables the user, after having set into the displayed map an insertion picture such as an expanded picture, a birds-eye view picture, or an original picture, to select an arbitrary ground point on the displayed map, select the insertion picture, and activate the insertion picture generating section 108, to thereby designate that the insertion picture is to be shifted to a location centered on the selected ground point. The extraction line generating section 108d automatically executes such shifting, and generates an extraction line, i.e. an indicator line, pointing from the original location to the shifted location of the insertion picture. Such an extraction line preferably is generated such as to extend between the position of a specific point in the picture when the picture is in the non-shifted condition (that point being located on the opposite side of the picture from the shifted location) to the position of that same point in the picture when the picture is in the shifted condition.

In addition to such operations on an insertion picture, the extraction line generating section 108d can also be applied to shifting of such map elements as character strings, symbols, or dots indicating the positions of institutions or landmarks in the map. In that case, the user selects the character string, symbol, or dot which is to be shifted, then selects an arbitrary ground point on the map as the position to which shifting is to be executed. The extraction line generating section 108d then executes the shift operation, i.e., to a location which is centered on the selected ground point, and generates an extraction line extending between the original location of the character string, symbol or dot and the shifted location.

Figure 5:
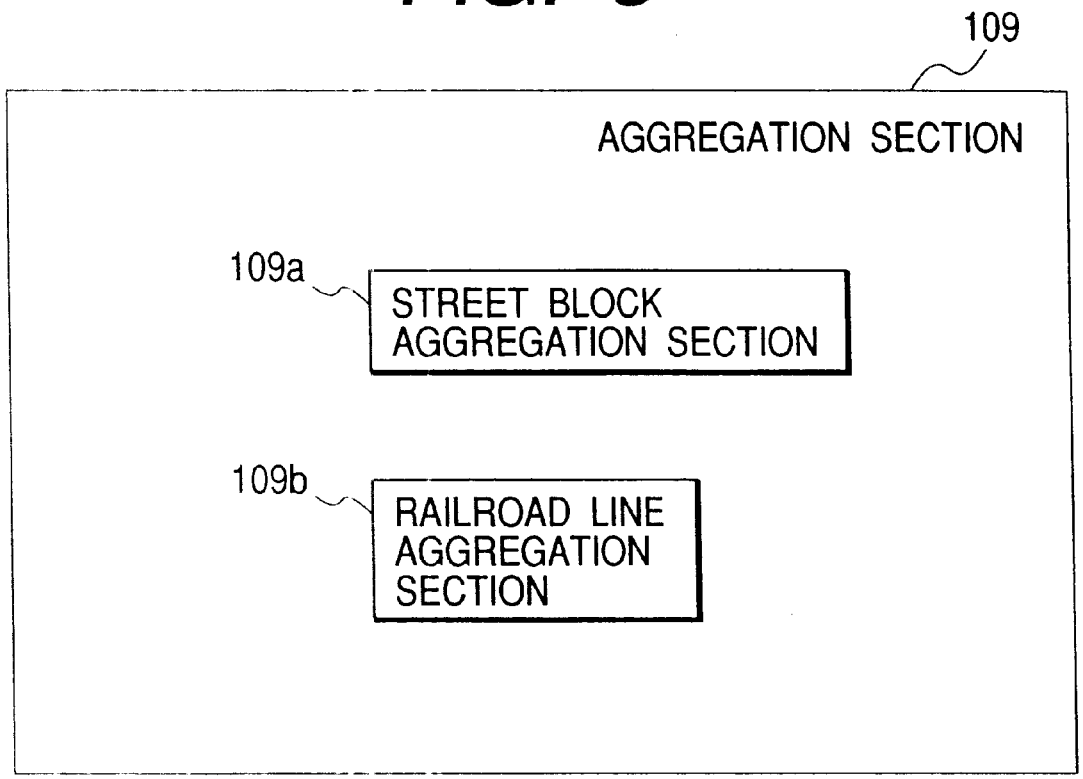
FIG. 5 is a conceptual block diagram for illustrating internal sections of an aggregation section of the embodiment of FIG. 1.

As shown in FIG. 5, the aggregation section 109 consists of a street block aggregation section 109a and a railroad line aggregation section 109b. The street block aggregation section 109a enables a user to select an arbitrary plurality of street blocks on the displayed map, with the selected street blocks then being automatically combined into a single street block (i.e., with any street segments located between any of these street blocks being eliminated) to thereby simplify the map.

The railroad line aggregation section 109b, when activated, automatically combines any plurality of railroad lines which are disposed substantially mutually adjacent in a region of the map with a degree of concentration that exceeds a predetermined level, into a single representative railroad line which runs along a median line of that plurality of railroad lines, to thereby simplify the map.

Figure 6A:
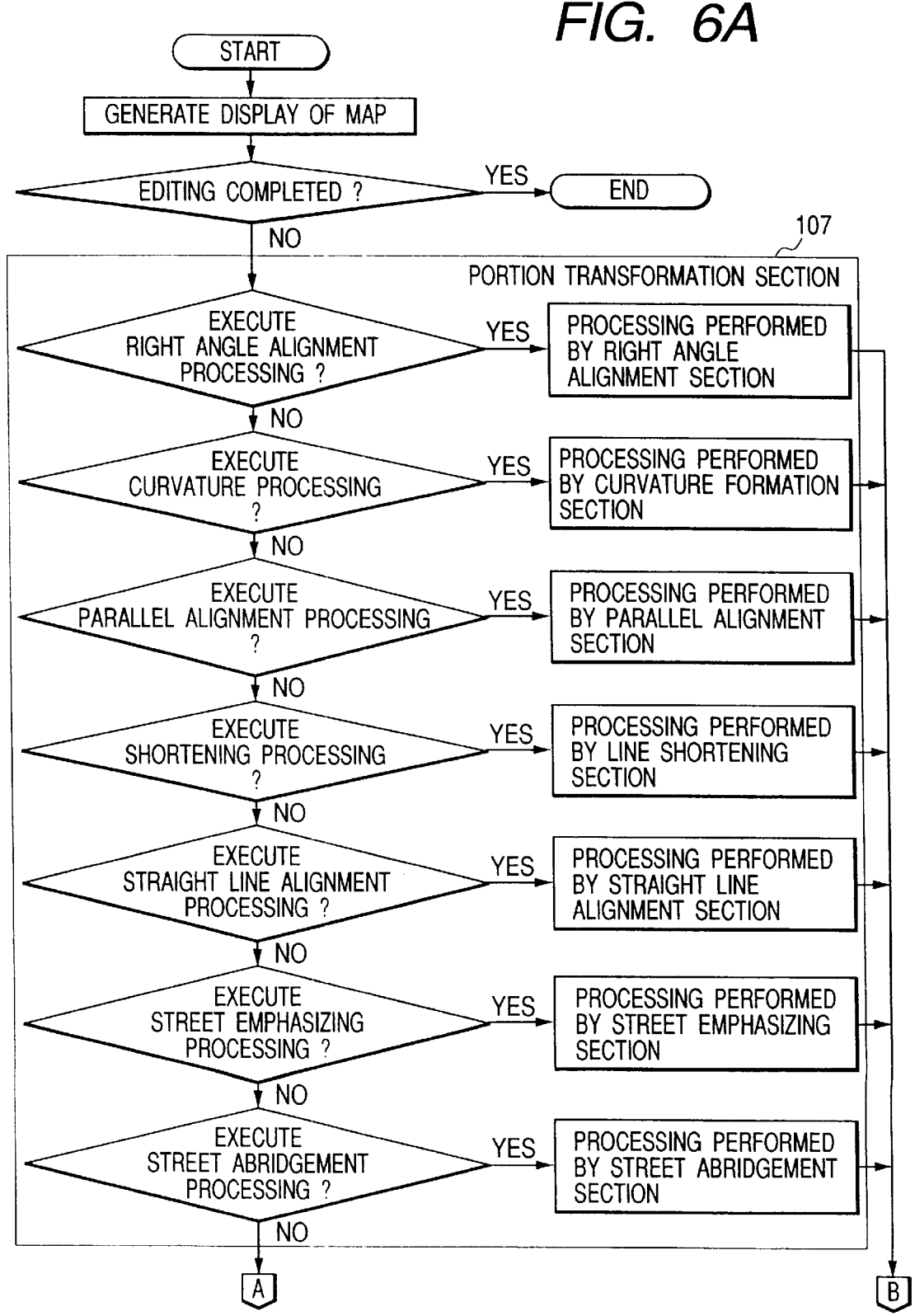
Figure 6B:
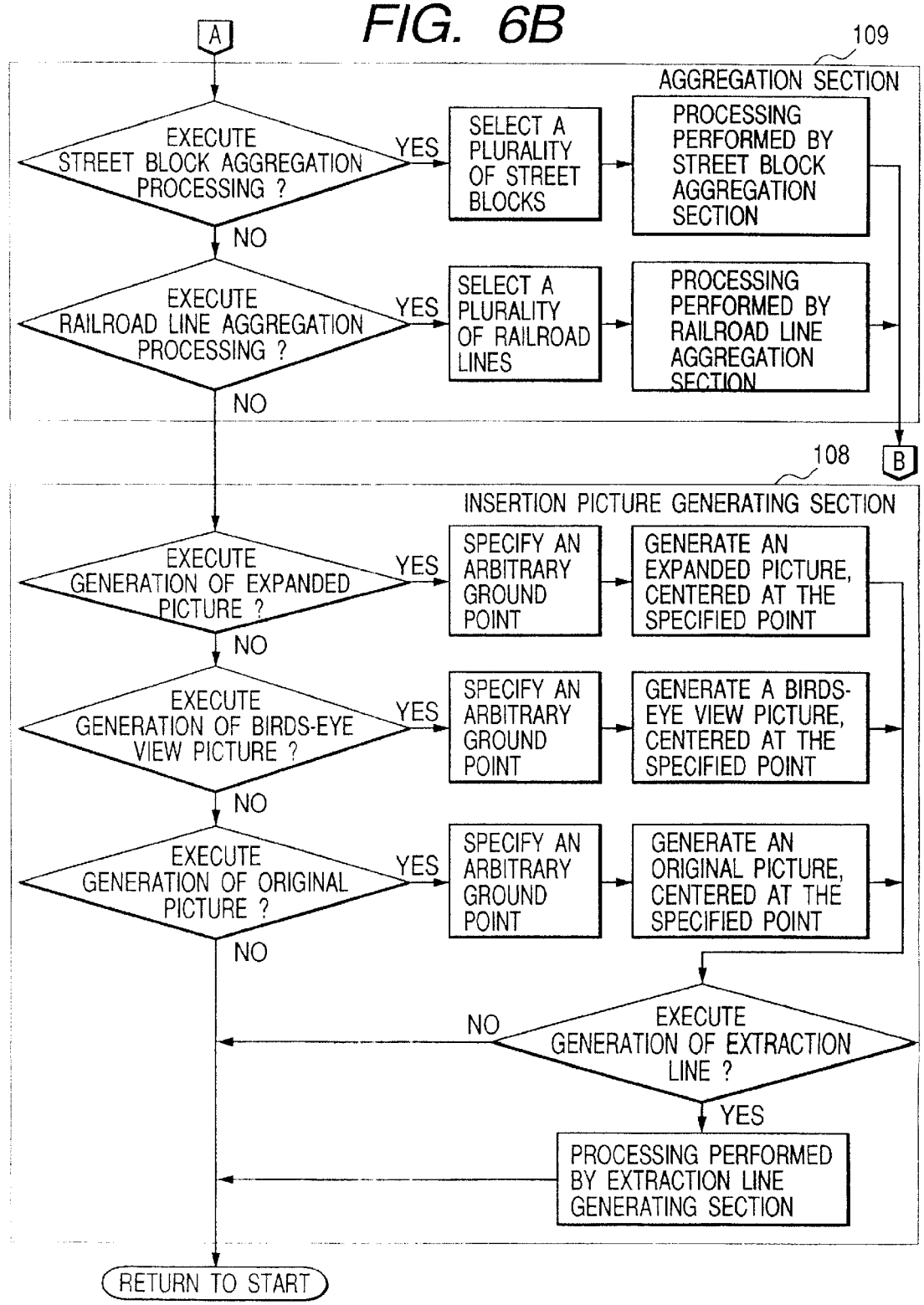
Figure 6C:
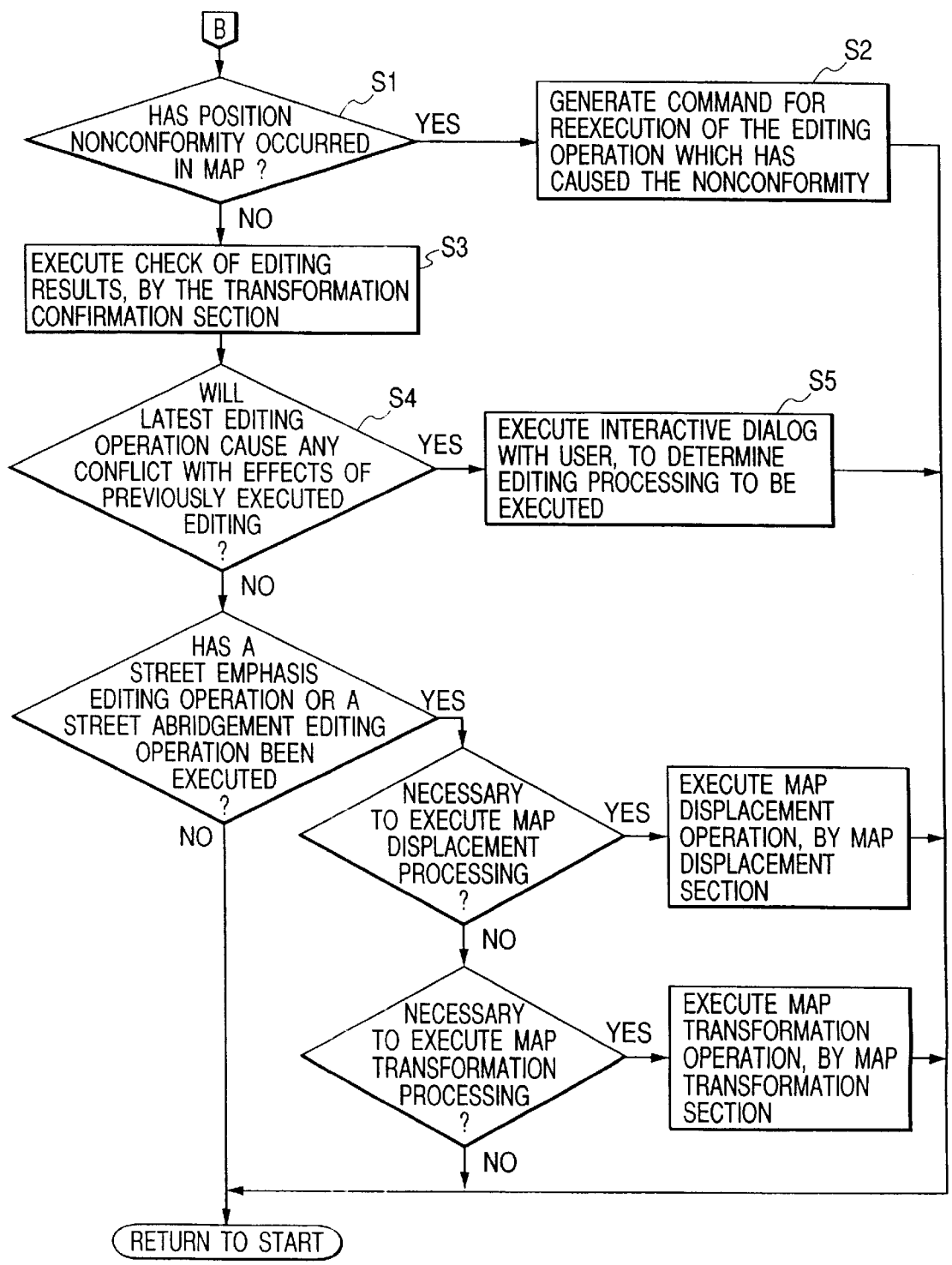
Figure 7:
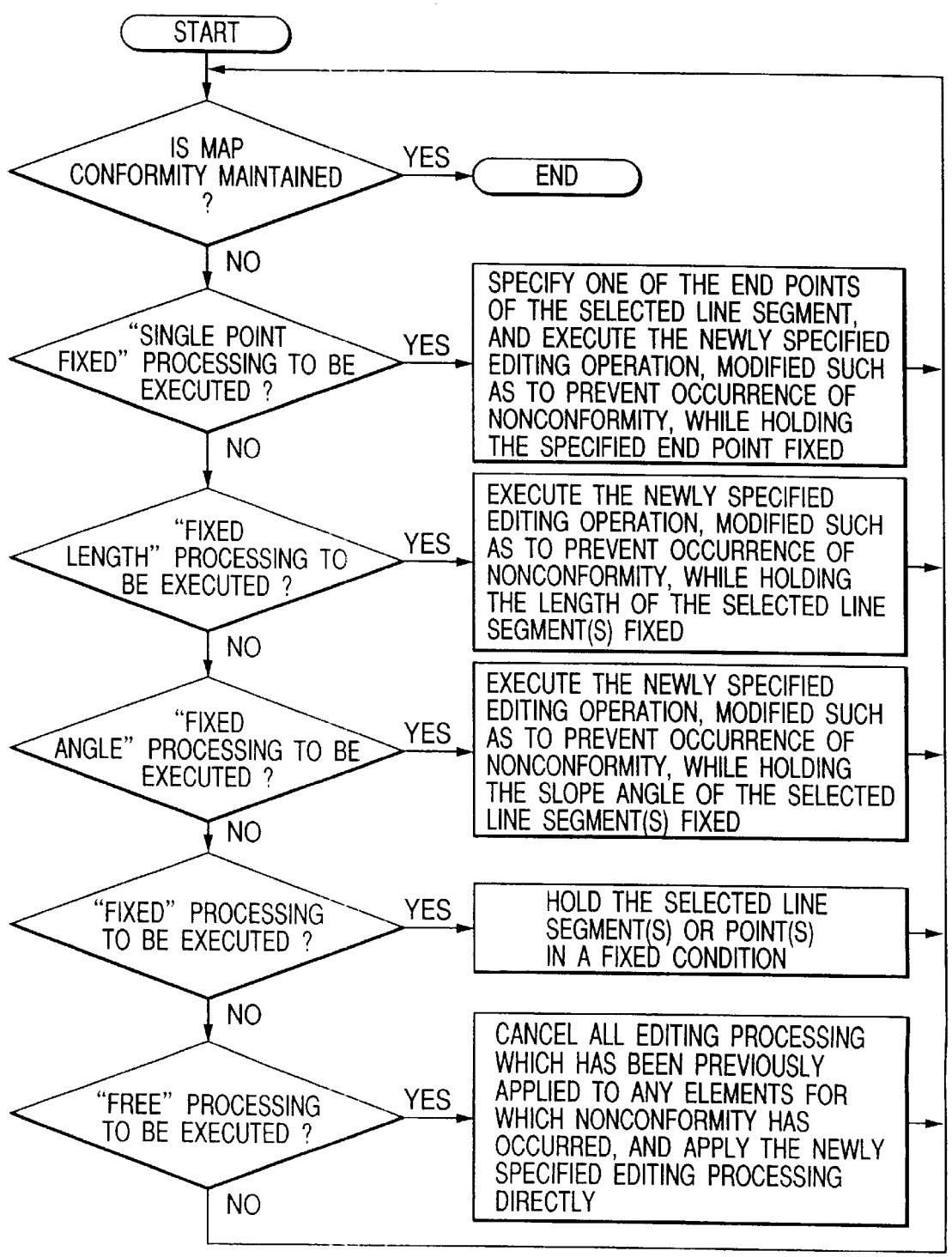
FIG. 7 is a flow diagram of processing which is executed by a transformation confirmation section of the conformity management section.

FIGS. 6A, 6B and 6C together constitute a basic flow diagram of the processing which is executed by the map editing apparatus 103 to implement the functions of map editing apparatus, with FIG. 6A being a basic flow diagram of the processing which is executed to implement the functions of the portion transformation section 107, FIG. 6B being a basic flow diagram of the processing executed to implement the functions of the aggregation section 109 and of the insertion picture generating section 108, and FIG. 6C being a basic flow diagram of the processing executed to implement the functions of the conformity management section 106. FIG. 7 is a basic flow diagram of processing which is executed to implement the functions of the transformation confirmation section 106d of the conformity management section 106.

The operation of this map editing apparatus will be described in the following. Firstly, when the user uses the input apparatus 101 to specify a map which is to be displayed (i.e., either an original map which is stored in the map database 102, or a selected region of such an original map), the input section 104 of the map editing apparatus 103 reads out data expressing the required map from the map database 102, through the map read-out section 105. The display section 110 then sends the map data to the display apparatus 111, whereupon the input section 104 returns to a condition of waiting for an editing input command from the input apparatus 101, i.e. information for selecting one or more map elements, and/or for designating that one of the various sections of the map editing apparatus described hereinabove is to be activated.

Figure 8:
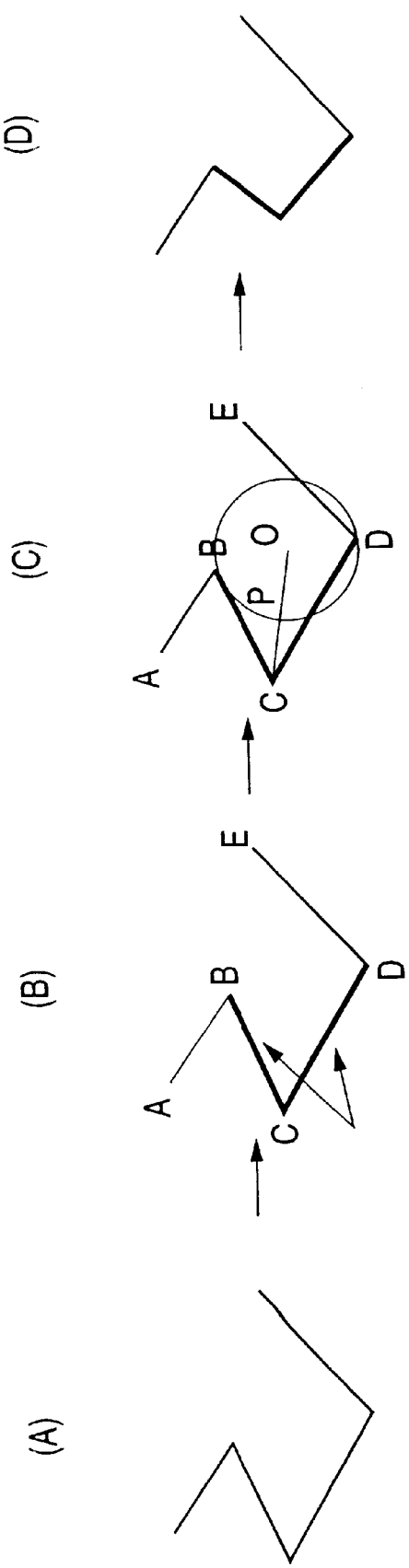
FIG. 8 illustrates, based on a portion of a displayed map, the effects of processing which is executed by a right angle alignment section for arranging two selected connected line segments of the map to meet at a right angle.

FIG. 8 shows an example of the operation of the right angle alignment section 107a of the portion transformation section 107. This operation is initiated when the user inputs a request for activation of the function of the right angle alignment section 107a, and selects a pair of connected line segments, which are to be arranged to meet at right angles. In FIG. 8 it is assumed that, with the right angle alignment section 107a set in operation, the user selects the connected line segments BC and CD of the series of successively connected line segments ABCDE, as shown in diagram (B).

As shown in diagram (C) of FIG. 8, the junction point of the two selected line segments BC, CD is shifted such that the line segments CD will meet at a right angle, by moving the junction point C to a point P. The point P lies on a circle whose diameter is a line which connects the respective outer end points B and D of the line segments BC and CD, and is the point of intersection between that circle and a line which connects the initial position of the junction point C to the center of that circle. The point P is thus used as a reference point for this processing.

However if this shifting of the position of point C to the intersection point P should result in occurrence of nonconformity of position relationships in the displayed map (i.e., with this embodiment, mutual overlapping of map elements) then that will be detected by the map conformity section 106a of the conformity management section 106 (as shown in step S1 of the flow diagram of FIG. 6C) which thereupon issues a request for recalculation of the position to which the junction point C is to be moved (step S2 in FIG. 6C). As a result, the right angle alignment section 107a moves the junction point C from the point P along the circle, through an arc of predetermined length (e.g., an arc which is a predetermined proportion of the circle circumference) and direction, to obtain a new position for the junction point C. If the map conformity section 106a then judges that conformity of position relationships is now maintained, the junction point C is left at that position, however if not, another request for recalculation is issued, and as a result the junction point C is moved further along the circle, by the predetermined distance. These operations are repeated until a position is found for the junction point C at which nonconformity of position relationships in the map no longer occurs, as illustrated in diagram (D) of FIG. 8.

It can thus be understood that the actual function of the right angle alignment section 107a (in cooperation with the function of the map conformity section 106a) is to arrange the selected pair of line segments to meet at an angle which is as close to a right angle as is possible without causing nonconformity of position relationships to occur in the map.

FIG. 9 is a simple flow diagram illustrating the processing which is executed to implement the function of the right angle alignment section 107a.

Figure 10:
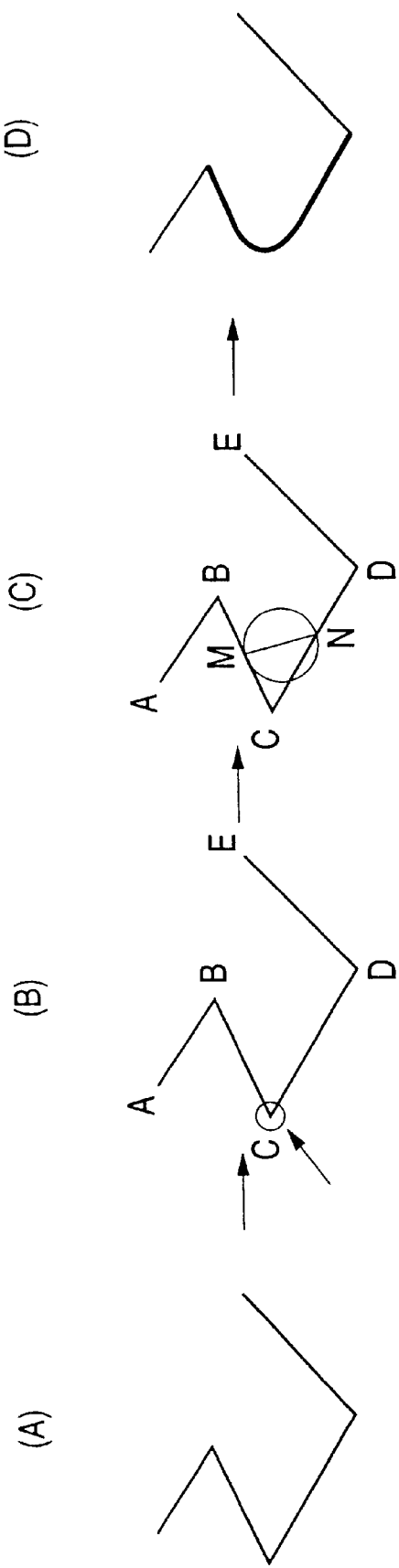
FIG. 10 illustrates, based on a portion of a displayed map, the effects of processing which is executed by a curvature formation section for arranging two selected connected line segments of the map to meet along a curved line.

FIG. 10 shows an example of the operation of the curvature formation section 107b of the portion transformation section 107. This operation is initiated when the user inputs a request for activation of the function of the curvature formation section 107b, and selects the junction point of a pair of connected line segments, which are to be shaped with respective curvatures such as to meet along a curved line. In FIG. 10 it is assumed that, with the curvature formation section 107b set in operation, the user selects the junction point C of the connected line segments BC and CD of the series of successively connected line segments ABCDE, as shown in diagram (B). As shown in diagram (C) of FIG. 10, this function is performed by the curvature formation section 107b by first drawing a circle having as diameter the line which connects the respective mid-points M and N of the line segments BC and CD, with these mid-points M and N serving as reference points for processing. The selected line segments are then replaced by the connected series of straight and curved line segments BMND, with MN being an an arc of the aforementioned circle, which is on the same side of the circle (i.e., with respect to the center of the circle) as the original junction point C. The result is illustrated in diagram (D) of FIG. 8.

However if this should result in occurrence of nonconformity of position relationships in the displayed map (e.g., due to the arc portion MN overlapping some other map element) then the map conformity section of the conformity management section 106 issues a request for recalculation. In response, the curvature formation section 107b executes processing whereby the points M and N are each moved towards the original junction point C by respective predetermined amounts (e.g., a predetermined proportion of the initial line segment length) to thereby cause the diameter of the aforementioned circle to be made smaller, i.e., in an attempt to find a degree of curvature for which nonconformity of position relationships in the map will no longer occur. If that is not successful, then the diameter of the circle is again reduced successively until a condition of curvature is reached at which conformity of position relationships is maintained in the map.

FIG. 11 is a simple flow diagram illustrating the processing which is executed to implement the function of the curvature formation section 107b.

Figure 12:
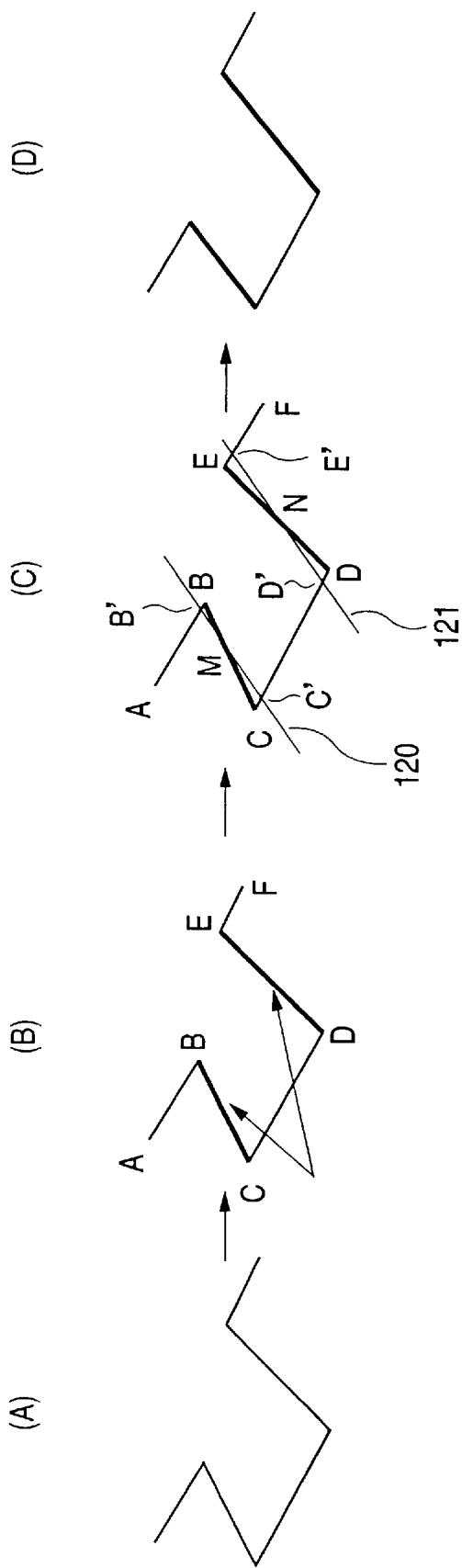
FIG. 12 illustrates, based on a portion of a displayed map, the effects of processing which is executed by a parallel alignment section, for arranging two selected line segments to become mutually parallel.

FIG. 12 shows an example of the operation of the parallel alignment section 107c of the portion transformation section 107. This operation is initiated when the user inputs a request for activation of the function of the parallel alignment section 107c, and selects a pair of line segments which are to be arranged mutually in parallel. In the example of FIG. 12, as shown in diagram (B), the user selects a pair of adjacent line segments BC and DE of the series of line segments ABCDEF. The processing executed by the parallel alignment section 107c to perform this function is as follows. First, the average of the respective angles at which the two line segments are oriented (i.e., slope angles with respect to a predetermined horizontal or vertical direction) is obtained, Two lines are then drawn, each oriented at that average angle, which respectively pass through the mid-points M and N of the line segments BC and DE. The respective points of intersection B', C' between one of these two parallel lines and the line segments AB, CD are then obtained, as are their respective points of intersection D, E' between the other one of the two parallel lines and the line segments CD, EF. The line segments BC, DE are then shifted to the respective positions shown as B'C' and D'E' in diagram (C), and so have been arranged mutually parallel.

The mid-points M and N are used as reference points in the processing. If the processing results in occurrence of nonconformity of position relationships in the displayed map (e.g., due to one or more of the parallel lines overlapping some other map element) then the map conformity section 106a of the conformity management section 106 issues a request for recalculation. The parallel alignment section 107c responds by rotating each of the repositioned line segments BC, DE through a predetermined small angular amount, about the corresponding points M, N, i.e., to attempt to find a parallel condition for which nonconformity of position relationships in the map will no longer occur. If that is not successful, then the angular amount is changed, and the above processing is then repeated.

Figure 13:
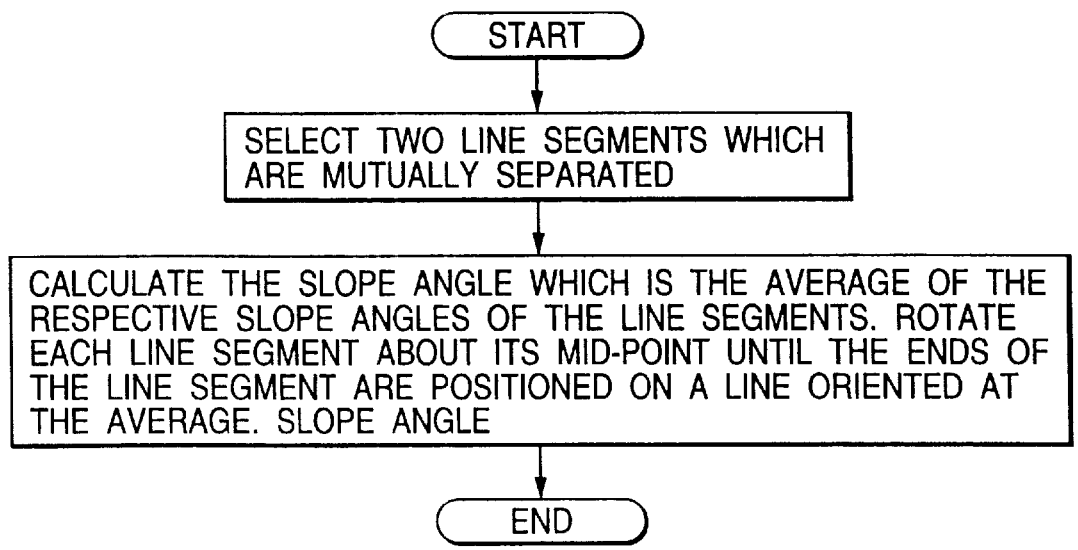
FIG. 13 is a basic flow diagram of the processing which is executed by the parallel alignment section.

FIG. 13 is a simple flow diagram illustrating the processing which is executed to implement the function of the parallel alignment section 107c.

FIG. 14 shows an example of the operation of the line shortening section 107d of the portion transformation section 107. This operation is initiated when the user inputs a request for activation of the function of the line shortening section 107d, and selects a line segment which is to be shortened. In the example of FIG. 14, as shown in diagram (B), the user has selected the segment CD. The line shortening section 107d then executes processing whereby that line segment is made shorter by a predetermined proportion of its current length, i.e., by the amount indicated by numeral 122 in diagram (C), through-shifting of the end points C, D of the line towards the mid-point of the line segment CD. In addition, all line segments which are connected to these end points of the selected line segment are shifted in parallel by the same amount as the corresponding end point, e.g., the line segment DE is shifted in parallel with point D, while line segments AB, BC are each shifted in parallel with point C. The resultant condition is as shown in diagram (D) of FIG. 14.

However if this should result in occurrence of nonconformity of position relationships in the displayed map, then the map conformity section of the conformity management section 106 issues a request for recalculation, whereupon the line shortening section 107d repeats the processing described above, using a smaller value for the proportion by which the length of the selected line segment is reduced. If necessary, such operations are repeated until a condition is reached at which conformity of position relationships is maintained in the map.

Figure 15:
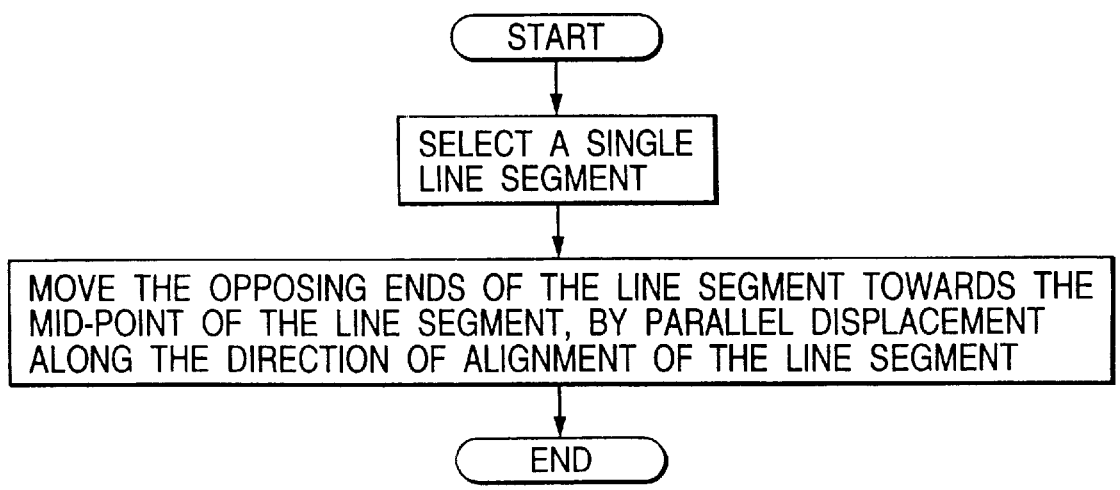
FIG. 15 is a basic flow diagram of the processing which is executed by the line shortening section.

FIG. 15 is a simple flow diagram illustrating the processing which is executed to implement the function of the line shortening section 107d.

Figure 18:
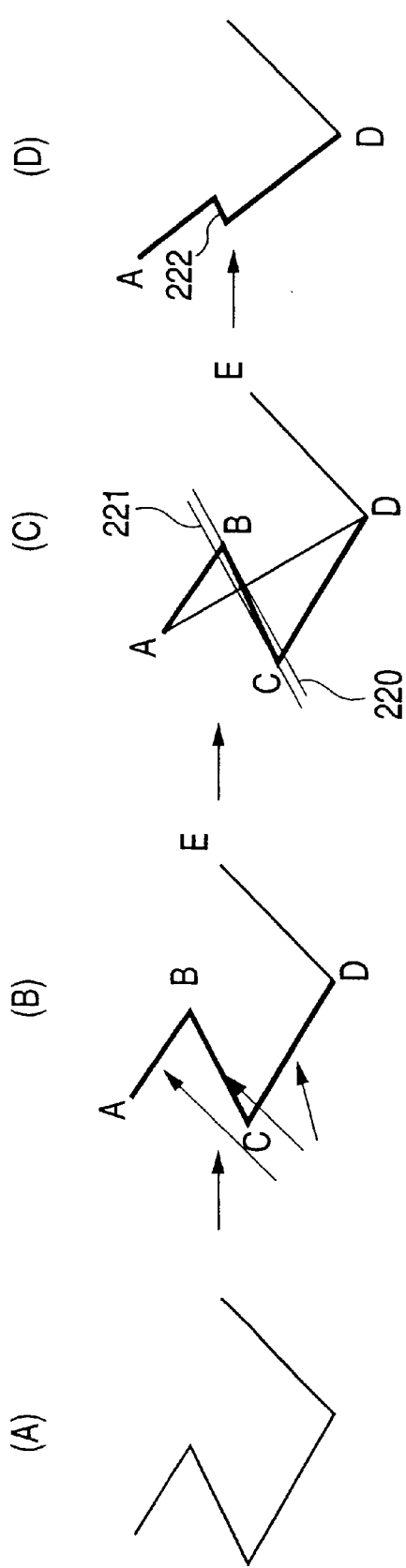
FIG. 18 illustrates, based on a portion of a displayed map, the effects of processing which is executed by the straight line alignment section, for arranging three selected successively connected line segments of the map substantially along a single straight line.

FIG. 18 shows an example of the operation of the straight line alignment section 107e of the portion transformation section 107. This operation is initiated when the user inputs a request for activation of the function of the straight line alignment section 107e, and selects a plurality of successively connected line segments which are to be arranged along a straight line. In the example of FIG. 12, as indicated by the arrows in diagram (B), the user selects three successively adjacent line segments AB, BC and DE of the series of line segments ABCDE. The processing executed to perform this function is, in the simplest case, to draw a straight line between the outermost end points (A, D) of the set of selected line segments, and replace the selected line segments by that straight line.

Figure 16:
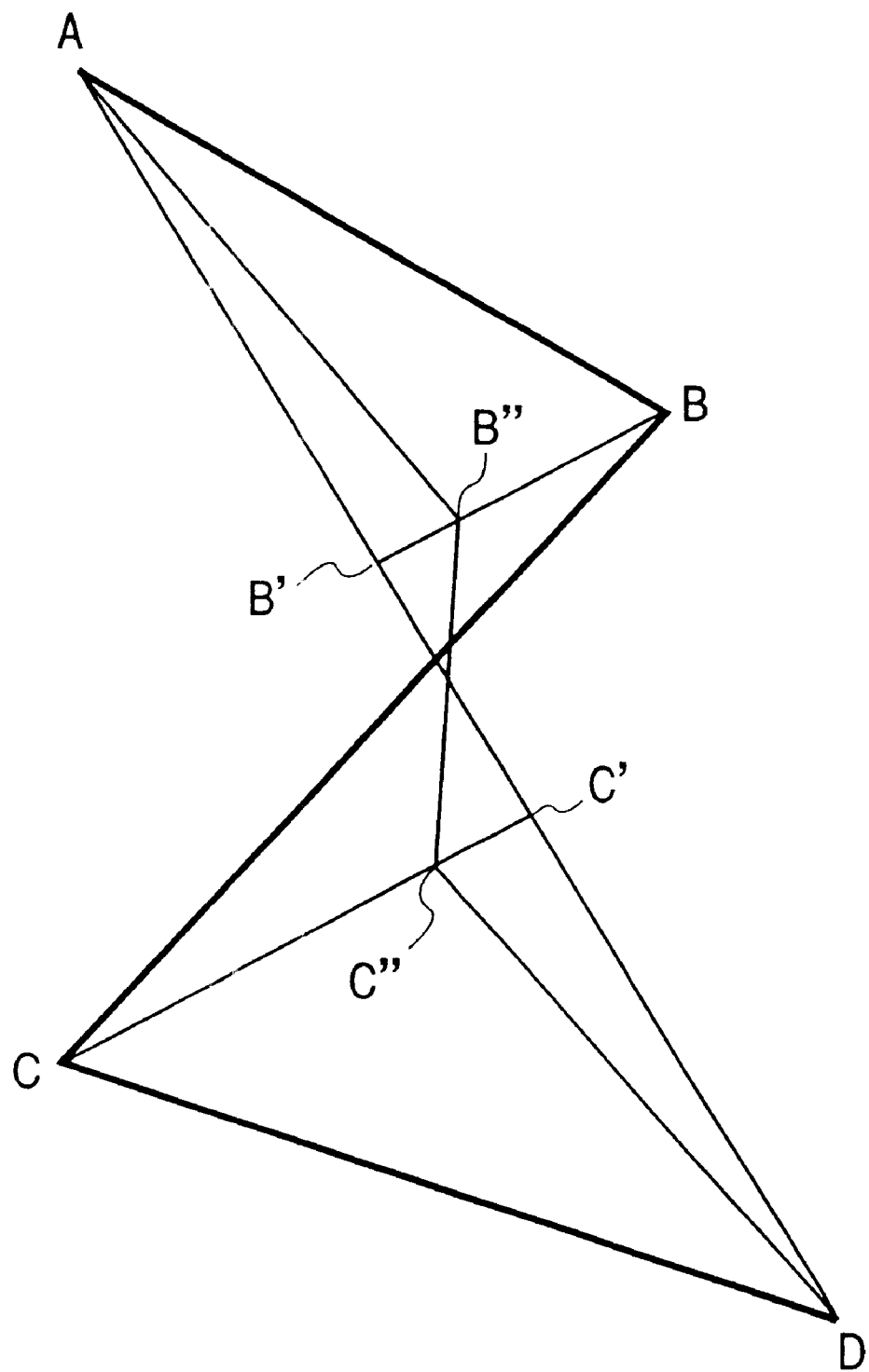
FIG. 16 is a diagram for use in describing the basic principles of a method of arranging a plurality of selected line segments along a single straight line, utilized by a straight line alignment section of the portion transformation section.
Figure 17:
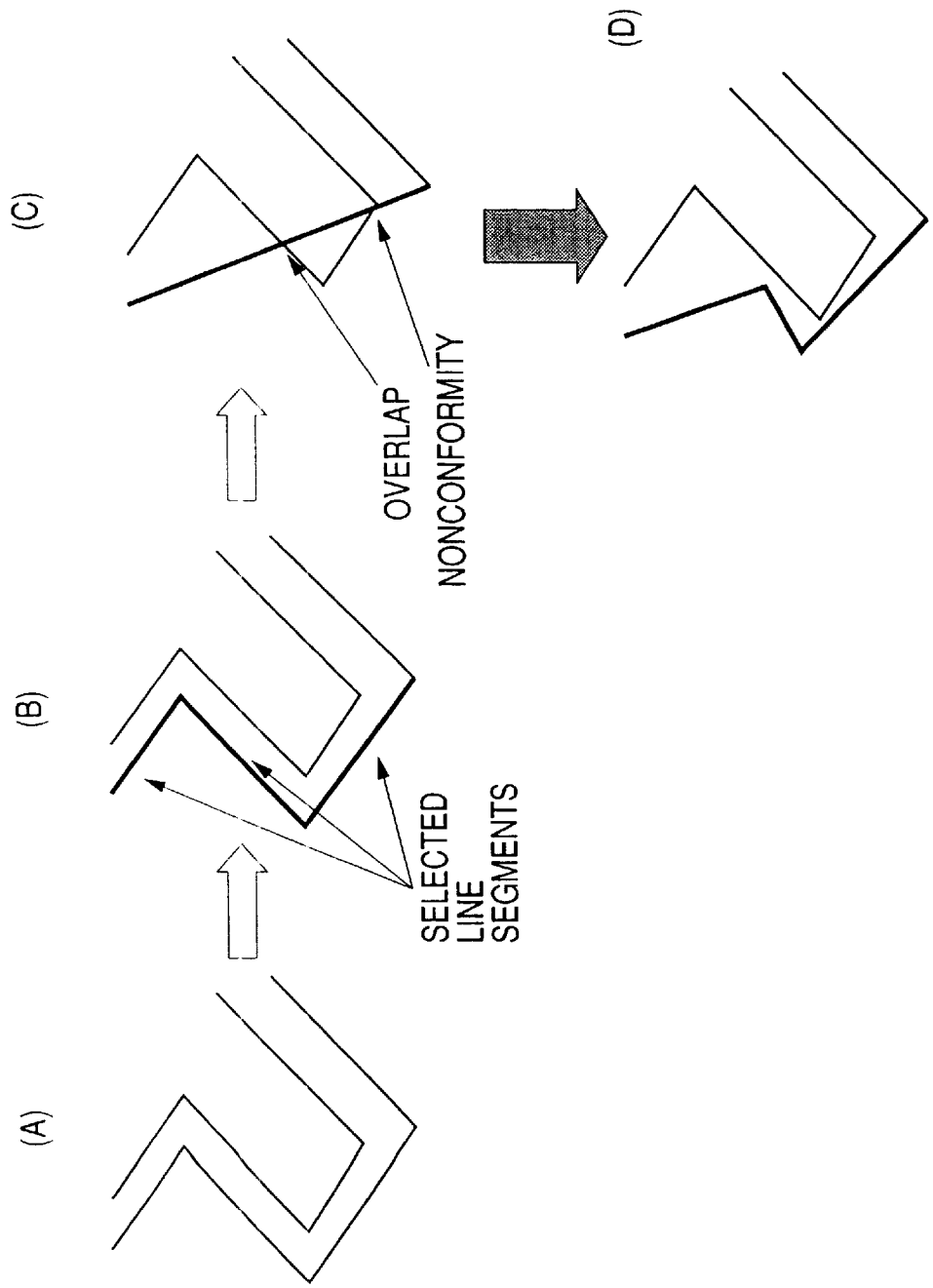
FIG. 17 is a diagram for illustrating a condition of a portion of a map whereby nonconformity due to overlapping occurs as a result of operation of the straight line alignment section, and is detected and corrected by the operation of the map conformity section of the conformity management section.

However nonconformity of position relationships of the map may occur as a result of this processing, as illustrated in the example of FIG. 16. In that example, starting from an initial condition of a portion of a displayed map as shown in diagram (A), three line segments are selected for straight line processing, as shown in diagram (B). However as shown in diagram (C), this results in overlap between the converted straight line and another map element. This condition is detected by the map conformity section 106a, and as a result the map conformity section 106a causes that editing processing to be modified, as described in the following, to change the straight line into an approximate straight line (formed of a plurality of line segments) as shown in diagram (D), whereby conformity is maintained in the map.

The above operation is illustrated in the example of FIG. 16. If it is found that use of the straight line AD to replace the line segments AB, BC, CD results in nonconformity of position relationships in the map, then the straight line alignment section 107e draws a line CC' which is at right angles to the straight line AD and passes through point C, and a line BB' which is at right angles to the straight line AD and passes through point B, as shown, A point C" is then established which is displaced from point C' along the line CC' by an amount which is a fixed proportion of the length of that line. Similarly, a point B" is established which is displaced from point B' along the line BB' by an amount which is a fixed proportion of the length of that line. The line segments ABCD are then replaced by the series of line segments AB"C"D, as an approximation to a straight line. However if nonconformity of position relationships still occurs in that case, the above processing is repeated, to shift the points B", C" further towards the points B, C respectively. Such operations are repeated, if necessary, until an approximate straight line is achieved which enables conformity of position relationships to be maintained in the map.

The successive effects of such processing are illustrated in FIG. 18, in which the line segments AB, BC and CD are selected as indicated by the arrows in diagram (B), the above-mentioned right-angle lines are drawn when it is found that nonconformity of position relationships has occurred, as indicated by numerals 220, 221 in diagram (C), and as a final result the selected line segments are replaced by the approximate straight line 222 shown in diagram (D).

Figure 19:
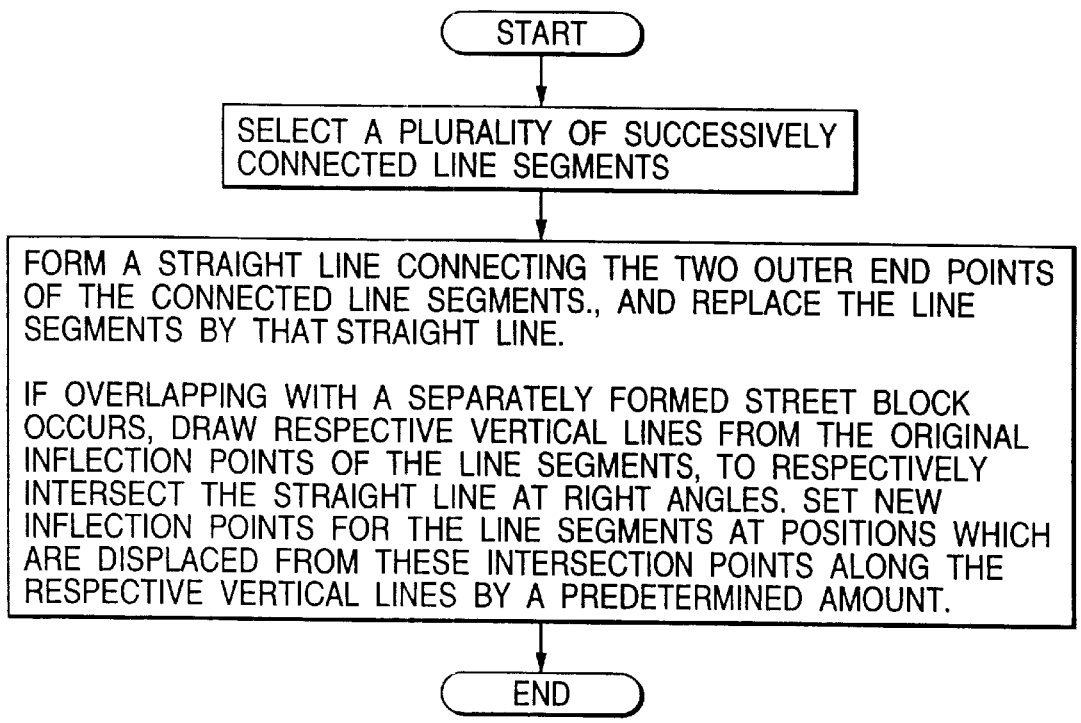
FIG. 19 is a basic flow diagram of the processing which is executed by the straight line alignment section.

The operation of the map conformity section 106a is illustrated by steps S1, S2 of the flow diagram of FIG. 6C FIG. 19 is a simple flow diagram illustrating the processing which is executed to implement the function of the straight line alignment section 107e.

Figure 20:
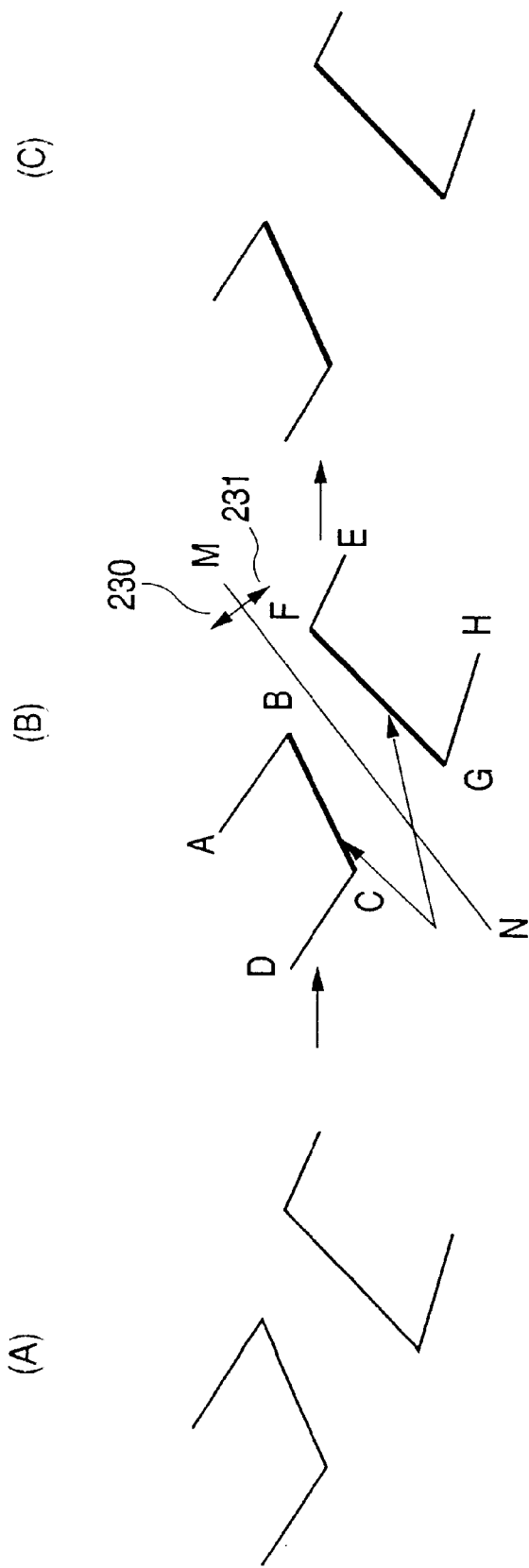
FIG. 20 illustrates, based on a portion of a displayed map, the effects of processing which is executed by a street emphasizing section, for widening a street segment formed between two selected opposing line segments, by shifting the selected line segments by a predetermined amount in respectively opposing directions away from a central reference axis.

FIG. 20 shows an example of the operation of the street emphasizing section 107f of the portion transformation section 107. This operation is initiated when the user inputs a request for activation of the function of the street emphasizing section 107f, and selects a pair of line segments which are to be moved apart by a predetermined proportion of the distance between them. It will be assumed in this example that the line segments are respective mutually opposing constituent segments of two adjacent street blocks, i.e., the line segments BC and FG shown in diagram (B) of FIG. 20. The processing executed by the street emphasizing section 107f is as follows. First, a straight line MN, referred to in the following as the street median line, is established which is oriented at an angle that is the average of the respective slope angles (as defined hereinabove) of the selected line segments BC and FG, and which is positioned midway between these line segments. Then as indicated by the arrows 230, 231 in diagram (B) of FIG. 20, the line segments BC and FG are moved respectively farther from the line MN, by an amount which is a predetermined proportion of the spacing between these line segments, as measured in a direction perpendicular to the street median line MN, i.e. the line segments BC, FG (together with all line segments which are connected to these) are subjected to equal and opposite amounts of parallel shift. A street segment which is formed between the line segments BC and FG is thereby made wider by this processing, and thereby is emphasized in the displayed map, as shown in diagram (C) of FIG. 20.

However if this should result in occurrence of nonconformity of position relationships in the displayed map, then the map conformity section 106a issues a request for recalculation. The street emphasizing section 107f responds by returning the selected line segments to their initial condition, and repeats the above operation using a smaller value for the proportional amount of shift that is applied to the selected line segments. Such operations are repeated, if necessary, until a degree of spacing between the selected segments is achieved which enables conformity of position relationships to be maintained in the map.

Figure 21:
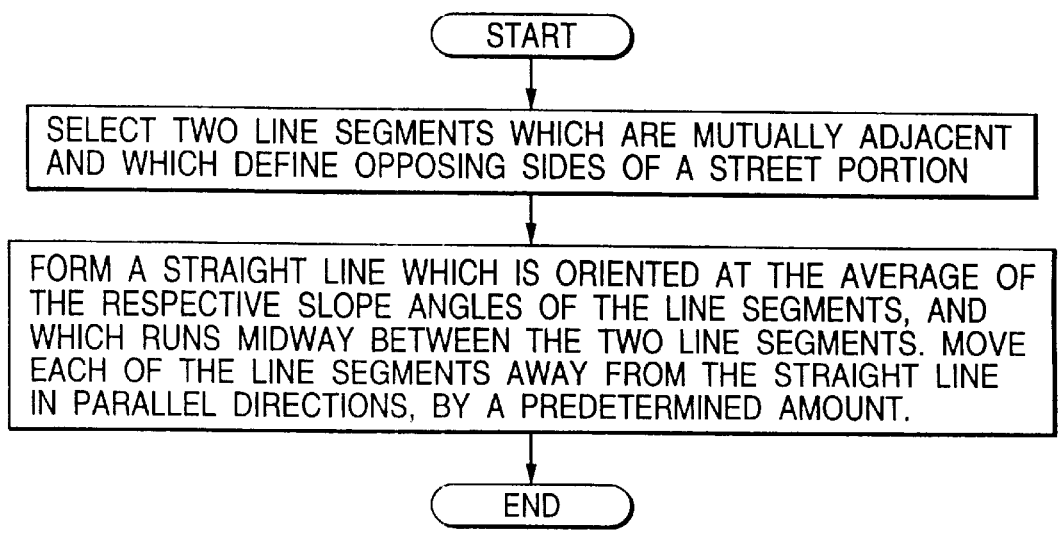
FIG. 21 is a basic flow diagram of the processing which is executed by the street emphasizing section.

FIG. 21 is a simple flow diagram illustrating the processing which is executed to implement the function of the street emphasizing section 107f.

Figure 22:
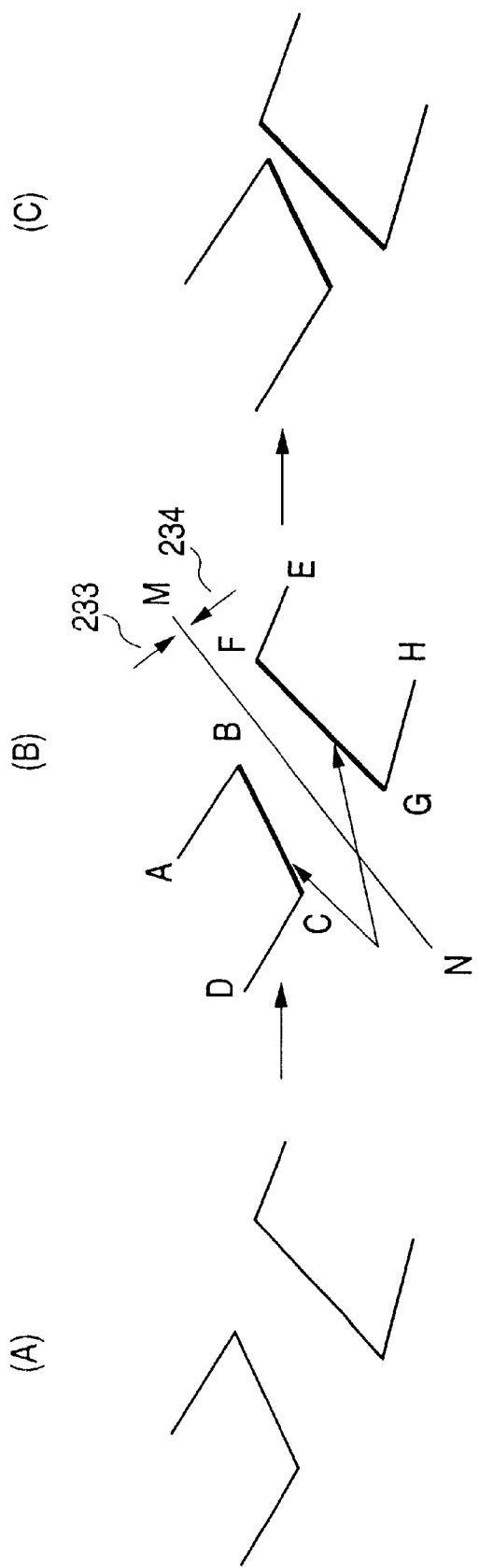
FIG. 22 illustrates, based on a portion of a displayed map, the effects of processing which is executed by a street abridgement section, for narrowing a street segment formed between two selected opposing line segments, by shifting the selected line segments by a predetermined amount in respectively opposing directions towards a central reference axis.

FIG. 22 shows an example of the operation of the street abridgement section 107g of the portion transformation section 107. This operation is initiated when the user inputs a request for activation of the function of the street abridgement section 107g and selects a pair of line segments which are to be moved closer together, by a predetermined proportion of the distance between them. It will be assumed in this example that the line segments are respective mutually opposing constituent segments of two adjacent street blocks, i.e., respective mutually opposing constituent segments of two adjacent street blocks, such as the line segments BC and FG shown in diagram (B) of FIG. 22. The processing executed by the street abridgement section 107g is as follows. First, the street median line MN is established, oriented at an angle that is the average of the respective slope angles of the selected line segments BC and FG, and positioned midway between these line segments. Then as indicated by the arrows 233, 234 in diagram (C) of FIG. 22, the line segments BC and FG are moved respectively closer to the line MN, by an amount which is a predetermined proportion of the spacing between these line segments, as measured in a direction perpendicular to the line MN, i.e. the line segments BC, FG (together with all line segments which are connected to these) are subjected to equal and opposite amounts of parallel shift. A street segment which is formed between the line segments BC and FG is thereby made narrower by this processing, as shown in diagram (C) of FIG. 22.

However if this should result in occurrence of nonconformity of position relationships in the displayed map, then the map conformity section 106a issues a request for recalculation. The street abridgement section 107g responds by returning the selected line segments to their initial condition, and repeats the above operation using a smaller value for the proportional amount of shift that is applied to the selected line segments. Such operations are repeated, if necessary, until a degree of spacing between the selected segments is achieved which enables conformity of position relationships to be maintained in the map.

Figure 23:
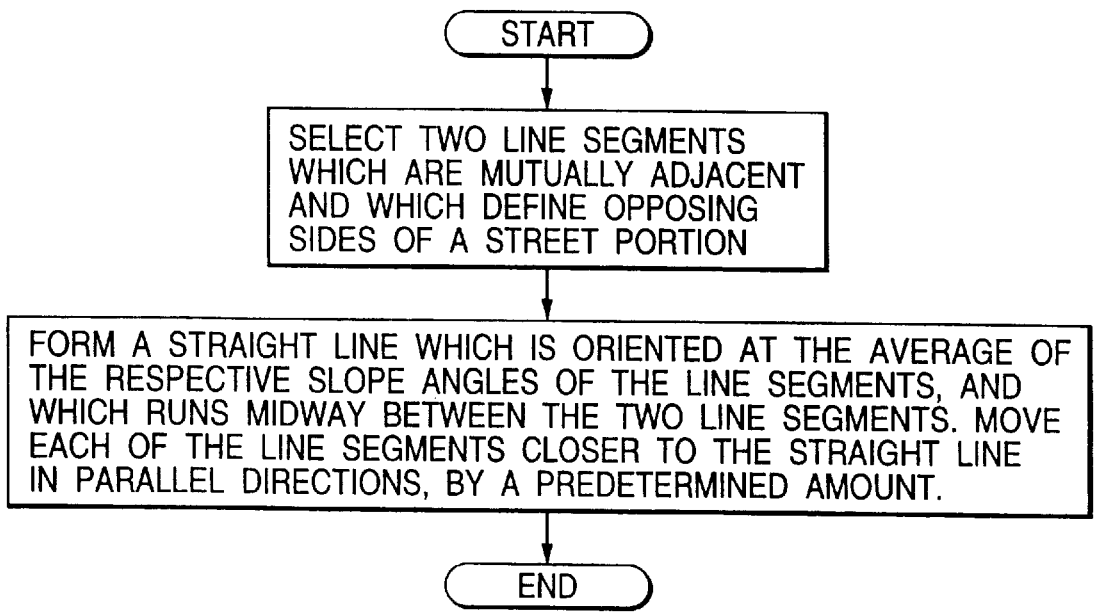
FIG. 23 is a basic flow diagram of the processing which is executed by the street abridgement section.

FIG. 23 is a simple flow diagram illustrating the processing which is executed to implement the function of the street abridgement section 107g.

Figure 24:
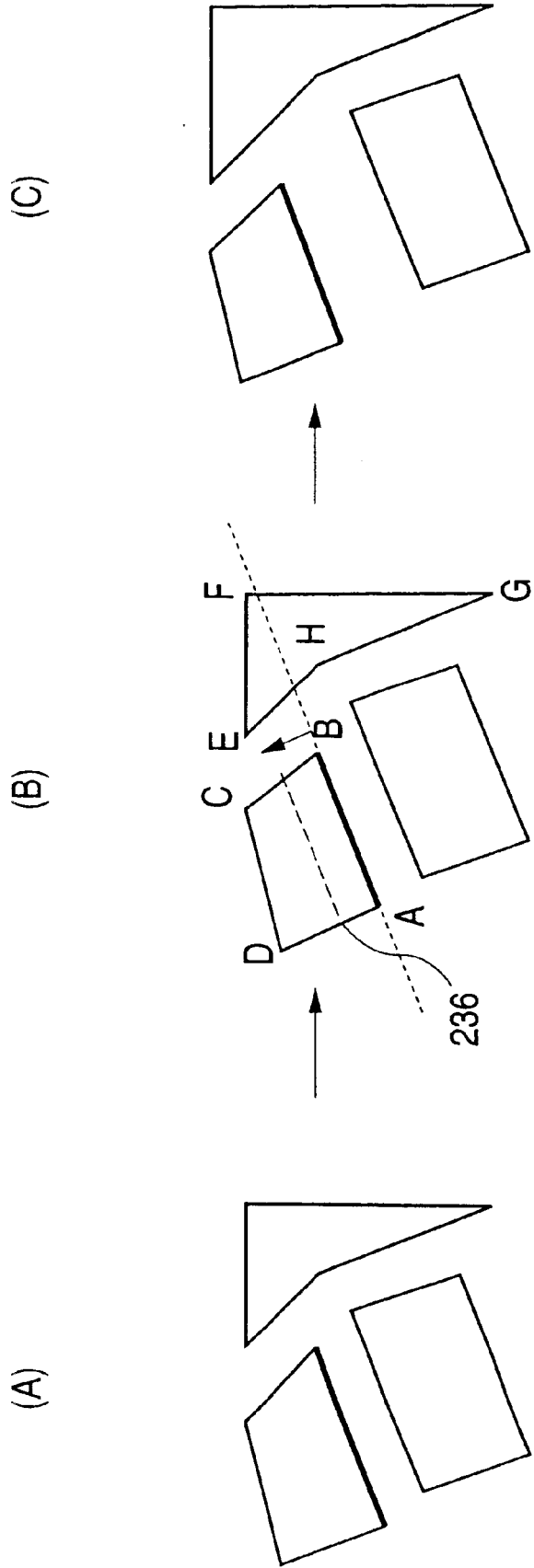
FIG. 24 illustrates, based on a portion of a displayed map, the basic effects of processing which is executed by a map displacement section after widening of a street segment has been executed by operation of the street emphasizing section, for maintaining conformity of position relationships throughout the map.

When the user activates the street emphasizing section 107f or the street abridgement section 107g to perform an editing operation, the map editing apparatus is set into a condition in which the user can specify that the function of the map displacement section 106b or the map transformation section 106c of the conformity management section 106 is to be executed. The purpose of the processing executed by the map displacement section 106b or the map transformation section 106c is to automatically ensure that relative position relationships between all map elements are accurately maintained as far as possible, in spite of a position shift of two opposing line segments which is executed by the function of the street emphasizing section 107f or the street abridgement section 107g, (i.e., in a case in which these line segments are constituents of respective street blocks such that a street segment is made wider or narrower as a result of such a shift). The operation of the map displacement section 106b will first be described, referring to FIG. 24. As shown in diagram (B), a line segment AB of a street block formed of the line segments ABCDEA is disposed adjacent to a street block formed of line segments EFGHE, and it is assumed that the line segment AB has been shifted to the position indicated by numeral 236, by the action of the street emphasizing section 107f as described hereinabove, i.e. by shifting of the line segment AB away from a street median line by a specific amount of displacement. In that case, if the user has specified that the function of the map displacement section 106b is to be executed, processing is executed to determine, for every map element of the map (other than the shifted line segments and any line segments attached thereto) whether that map element is disposed on a first side or on a second side of the street median line, or is a street block having apex points located on both sides of the median line. All map elements or apex points of street blocks which are disposed on the same side of the street median line as the selected line segment AB are then shifted in parallel with the shift of the line segment AB, by the same amount of shift. (Similar shifting in the opposite direction occurs on the opposite side of the street median line, but is omitted from FIG. 24 for simplicity of description.) As a result, the effect shown in diagram (C) of FIG. 24 is achieved, i.e., with the entire street block ABCDA having been shifted together with the segment AB, and with the apex points E, F of the street block EFGHA having been shifted by the same amount and direction as line segment AB, so that the position relationships between these two street blocks are maintained unchanged.

Figure 25:
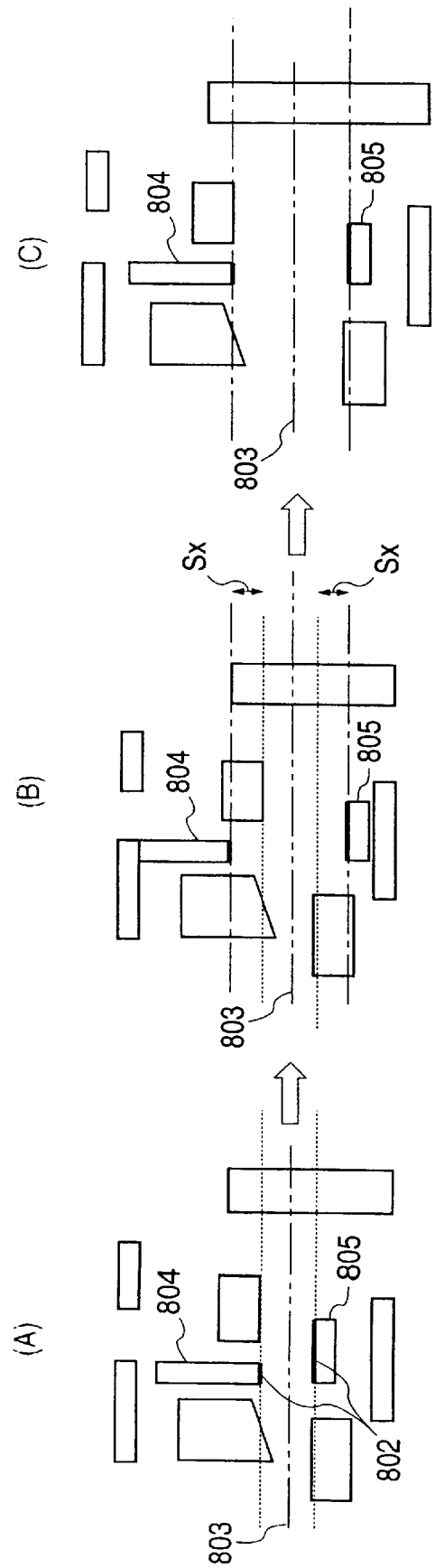
FIG. 25 illustrates in greater detail the effects of processing of the form shown in FIG. 24 upon a street which includes a street segment which has been widened.

The above function of the map displacement section 106b is illustrated in greater detail in the example of FIG. 25. Here, diagram (A) shows an initial condition of a map portion, in which the user selects two opposing line segments 802 which are constituent segments of street blocks 804, 805 respectively, with the map displacement section 106b set in operation. The street median line for the selected line segments is designated by numeral 803. After shifting by the predetermined amount (indicated as Sx) has occurred, the condition of the street blocks 804, 805 will be as shown in diagram (B) of FIG. 25. As shown, the relative positions of these street blocks with respect to the remainder of the map have been substantially altered, although overlapping of map elements has not occurred. If operation of the map displacement section 106b is selected by the user at that time however, the above-described shifting of all map elements and apex points which lie on the same side of the median line 803 as the street block 804, and similar shifting of all map elements and apex points which lie on the opposite side of that line, is executed. The result is as shown in diagram (C). As shown, position relationships are accurately maintained by such execution of overall shifting of elements of the displayed map, as far as possible.

The function of the map displacement section 106b in conjunction with that of the street emphasizing section 107f has been described in the above. If the map displacement section 106b is set in operation when an editing operation utilizing the street abridgement section 107g is performed, then the same operation as described above will be performed by the map displacement section 106b, but with the shifting of all map elements and apex points occurring in the opposite direction, i.e. towards the street median line, by the same amount of shift as that applied to the corresponding one of the two selected line segments, such as the selected line segments BC and GF in the example of FIG. 22 described above.

Figure 26:
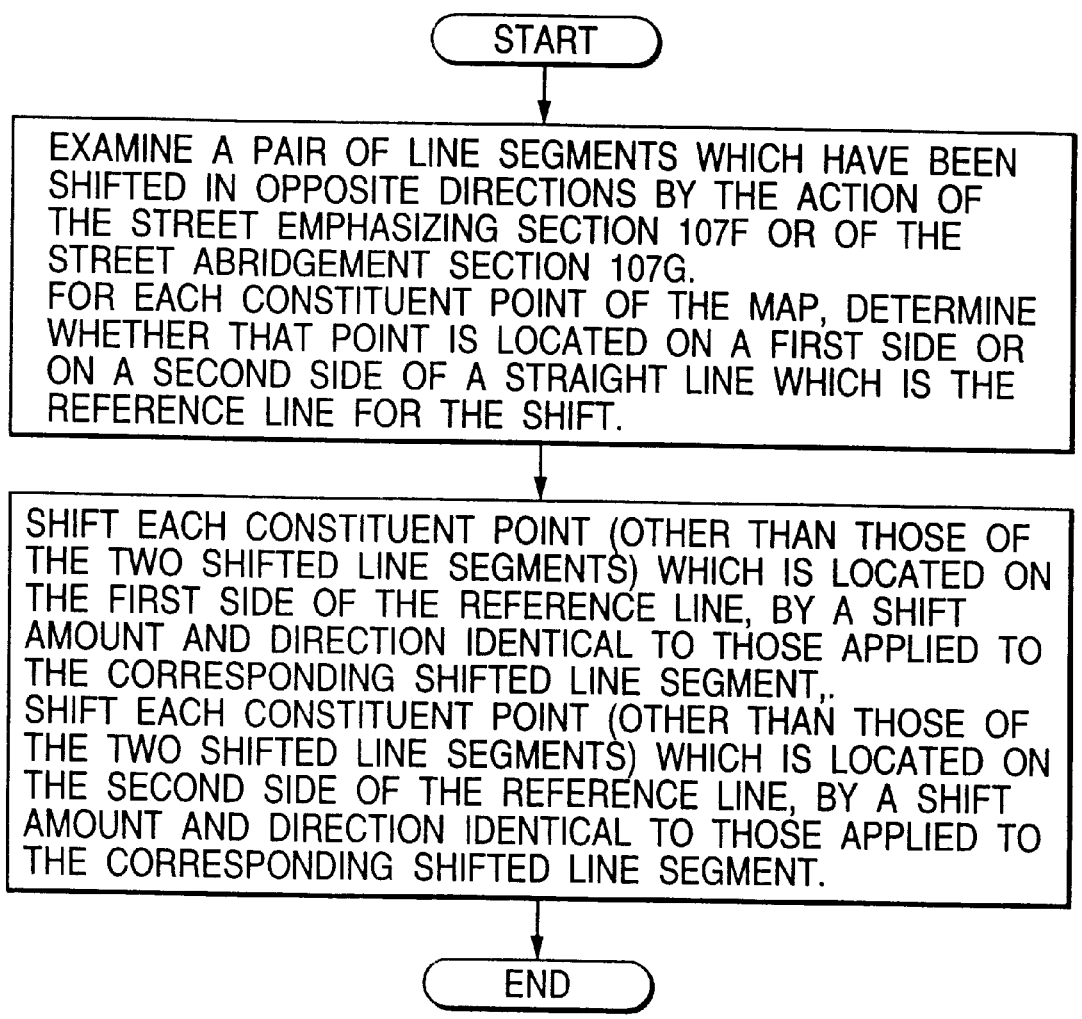
FIG. 26 is a basic flow diagram of the processing which is executed by the map displacement section.

FIG. 26 is a simple flow diagram illustrating the processing which is executed to implement the function of the map displacement section 106b.

Figure 27:
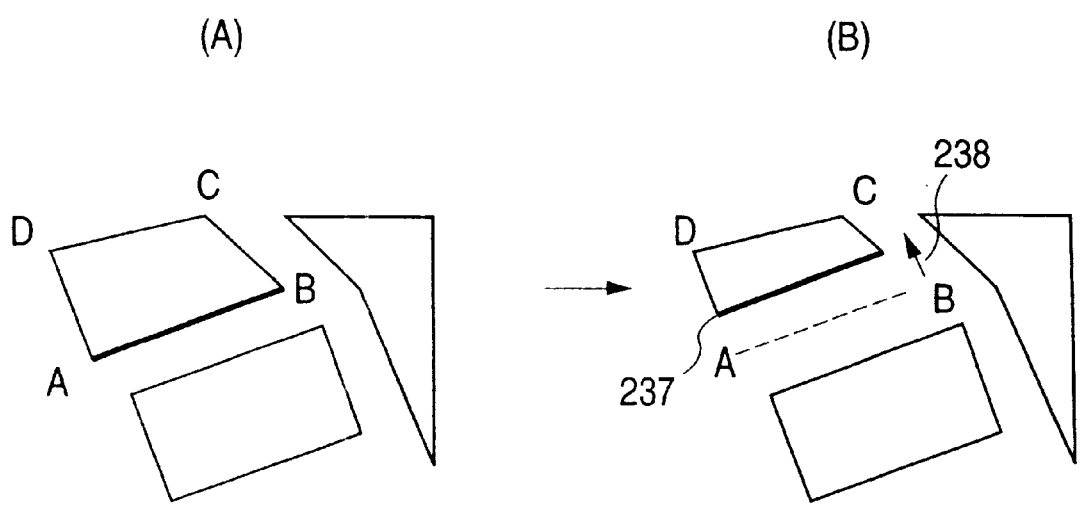
FIG. 27 illustrates, based on a portion of a displayed map, the basic effects of processing which is executed by a map transformation section of the conformity management section after narrowing of a street segment has been executed by operation of the street emphasizing section on a selected line segment, for maintaining conformity of position relationships between a street block containing the selected line segment and the remainder of the map.

The operation of the map transformation section 106c will now be described, referring to FIG. 27. As shown in diagram (B) of FIG. 27, a line segment AB of a street block formed of the line segments ABCDEA has been selected to be shifted to the position indicated by numeral 237, by the action of the street emphasizing section 107f as described hereinabove, i.e. by shifting of the line segment AB away from a street median line by a specific amount of displacement. In that case, if the user has specified that the function of the map transformation section 106c is to be executed, then rather than executing shifting of the entire street block ABCDEA together with the line segment AB, the apex point of the street block ABCDEA which is farthest from the selected line segment (i.e., in this example the point D) is held fixed in position, as a reference point, while each of the other apex points of that street block are shifted in parallel in the same direction as the shifted segment AB, by a proportion of the amount of shift applied to the selected line segment that is determined in accordance with the distance of the apex point from the selected line segment.

Figure 29:
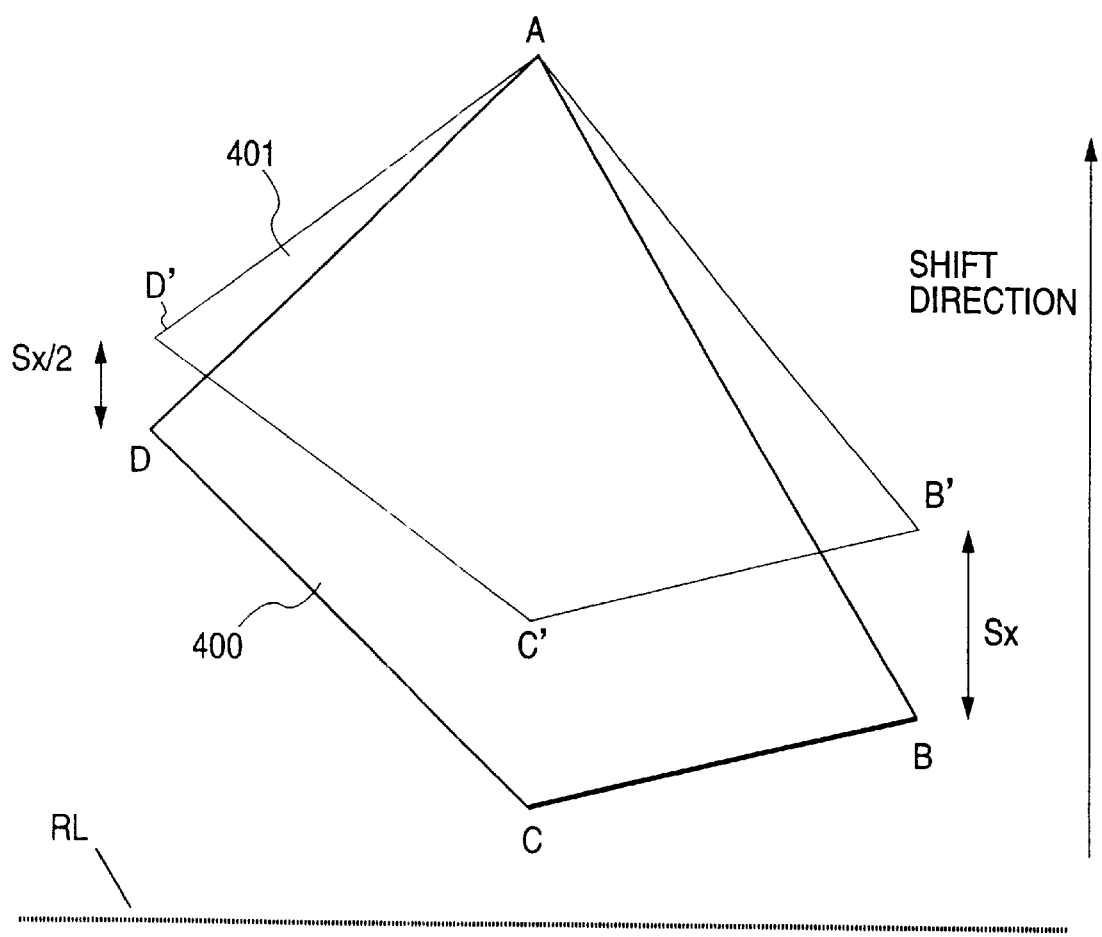
FIG. 29 is a diagram for illustrating the effects of the compression or contraction which is applied to a street block containing a selected line segment, by the operation of the map transformation section.
Figure 30:
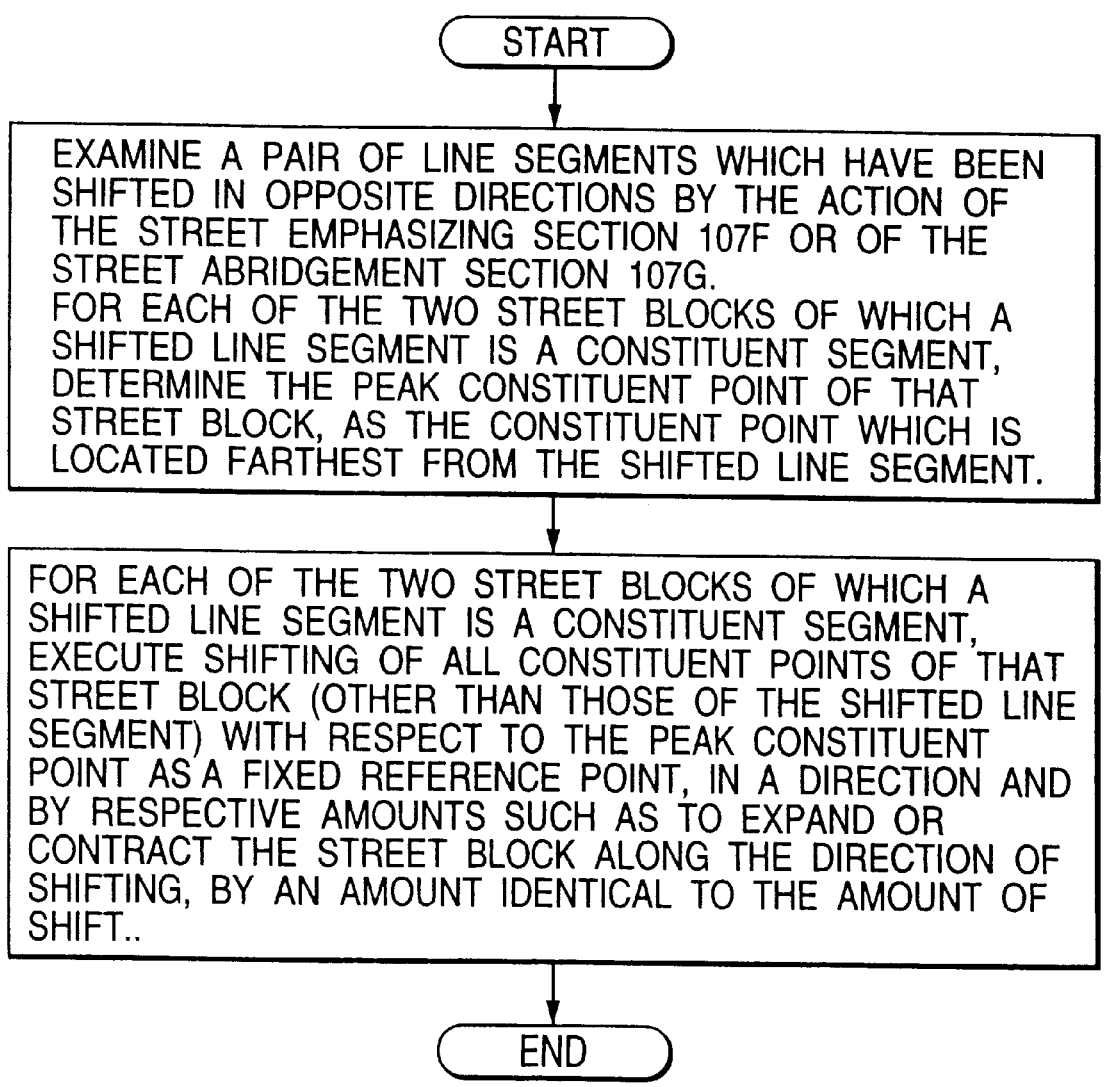
FIG. 30 is a basic flow diagram of the processing which is executed by the map transformation section.

The above is illustrated in the example of FIG. 29, in which the selected line segment BC of a street block 400, formed of line segments AB, BC, CD and DA is shifted away from the median line RL by an amount Sx, to the position indicated as B' C'. In this case, the apex point A becomes the fixed reference point. Assuming the apex point D is located midway between the reference point A and the nearest end C of the selected line segment BC (as measured along the shift direction), the amount of shift to be applied to point D will accordingly be made half of the shift amount Sx that is applied to the selected line segment BC. The shape of the street block 400 thus becomes changed to that indicated by numeral 401.

Figure 28:
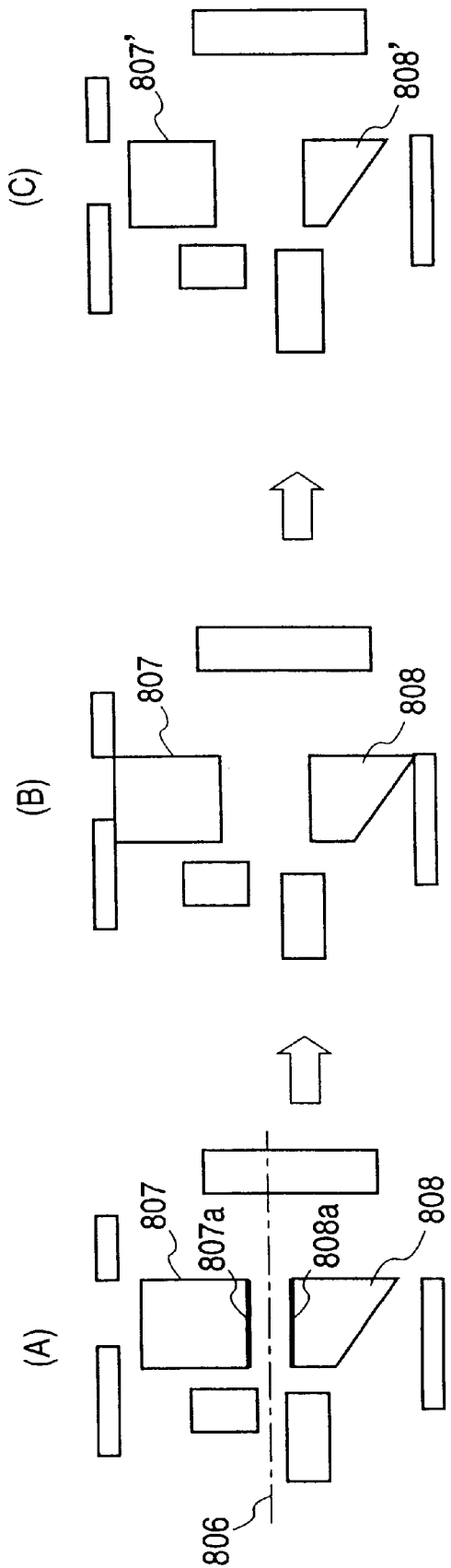
FIG. 28 illustrates in greater detail the effects of processing of the form shown in FIG. 27 upon a street which includes a street segment which has been widened.

The overall effect of using the map transformation section 106c in conjunction with the street emphasizing section 107f can be clearly understood from the example of FIG. 28. Here, selection of the line segments 807a and 808a of street blocks 807, 808 respectively to be shifted outward with respect to the median line 806 by operation of the street emphasizing section 107f as shown in diagram (A) will result in the condition shown in diagram (B). However if at that time the function of the map transformation section 106c is activated, then the result will be as shown in diagram (c) of FIG. 28. As shown, each of the street blocks 807, 808 has been altered in shape such as to produce widening of the street segment that is formed between line segments 807a, 808a, but the position relationships between these street blocks and the remainder of the map have been maintained unchanged as far as possible, by the operation of the map transformation section 106c.

In the above description, it has been assumed that the function of the street emphasizing section 107f or of the street abridgement section 107g is applied only to line segments which are constituent segments of respective street blocks, however either of these functions could of course be applied to any pair of adjacent line segments which are not constituent elements of street blocks.

Figure 31:
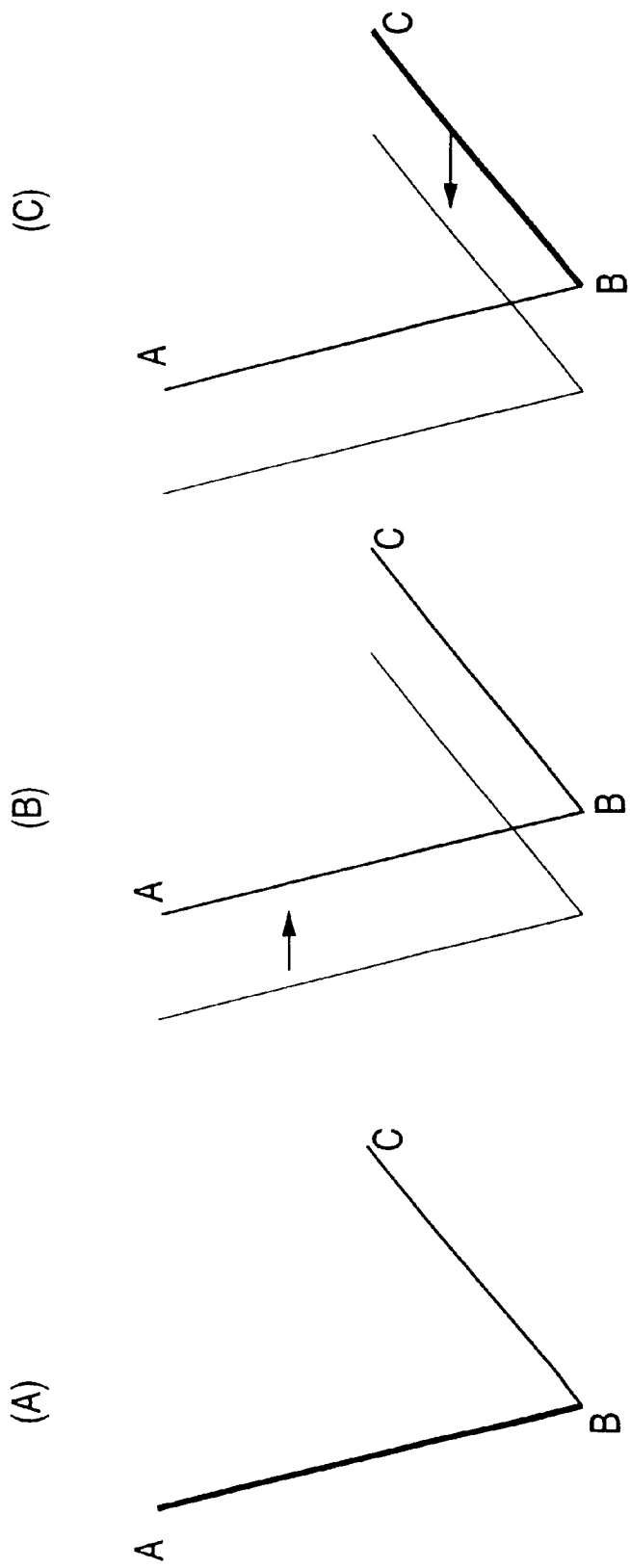
FIG. 31 shows an example of a conflict which arises between the effects a previously executed editing operation and those of a newly specified editing operation, and which is detected by the transformation confirmation section.

The function of the transformation confirmation section 106d of the conformity management section 106 will be described in the following. It is a feature of this embodiment of the invention that the user is enabled through the operation of the transformation confirmation section 106d to selectively determine whether priority is to be given to an editing operation which has been newly specified, or to editing operations which have been performed up to that point, in the event that a conflict arises between the effects of the new editing operation and those of previously executed editing, i.e., when the newly specified transformation editing operation that is to be applied to a constituent element of the displayed map will have an effect which partially or completely undoes the effect of a previously executed transformation editing operation. A very simple example of this is illustrated in FIG. 31. Here, diagram (A) shows two connected line segments AB, BC in an original map, i.e. prior to executing any editing operations on these line segments. The line segment AB is then selected by the user for a transformation editing operation which has the effect of shifting the line segment AB to the right, as shown in diagram (B). It is then assumed that subsequently, the user selects the line segment BC, and specifies an editing operation which will have the effect of shifting the segment BC to the left, as indicated by the arrow in diagram (C). The effect of the previous editing upon the line segment AB will thereby be partially or completely cancelled out by this newly specified editing operation. Such a condition is detected by the transformation confirmation section 106d, which maintains and successively updates a record of all transformation editing operations which are performed on the map.

When a conflict is found to occur between the effects of a newly specified transformation editing operation and the effects of previously executed transformation editing, the transformation confirmation section 106d causes the display section 110 to display to the user the effect of the proposed editing operation, using the display apparatus 111, and also initiates an interactive exchange with the user, via the input apparatus 101 and display apparatus 111, to obtain from the user a decision as to which of a plurality of possible courses of action is to be taken to resolve the conflict.

The function of the transformation confirmation section 106d is illustrated by steps S3, S4, S5 in the flow diagram of FIG. 6C, with the contents of step S5 being shown in more detail in the flow diagram of FIG. 7.

If it is found that a newly specified editing operation will conflict with a previously executed editing operation (i.e, a "yes" decision is reached in step S4 of FIG. 6C) then the system first asks the user (e.g., via a displayed message) whether "single point fixed" processing is to be executed. This applies when the newly specified editing operation will affect a selected line segment, If the answer is "yes", then the system asks the user to specify one of the end points of the selected line segment. The user can then specify an editing operation which will not require a change in position of the specified end point, and the processing flow then returns to the "start" condition of FIG. 6A, and the specified editing operation is thereafter executed.

Step S1 in FIG. 6C is then executed, in which the map conformity section 106a judges whether that editing operation will result in occurrence of nonconformity (as described hereinabove concerning the operation of the map conformity section 106a).

When a "NO" decision is reached in step S4, then the processing flow proceeds to the next stage, in which a decision is made as to whether the user has specified execution of a widening or a narrowing of the spacing between a pair of line segments, using the street emphasizing section 107f or the street abridgement section 107g.

If "single point fixed" processing is not selected by the user in step S5 of FIG. 6C, the system asks whether "fixed length" processing is to be executed. This applies when the newly specified editing operation will affect a selected line segment, If the answer is "yes", then user can then specify an editing operation which will not require a change in length of the specified line segment, and that editing operation is then executed, after being checked and modified if necessary by the operation of the map conformity section 106a.

If "fixed length" processing is not selected by the user, the system asks whether "fixed angle" processing is to be executed. This applies when the newly specified editing operation will affect a selected line segment, If the answer is "yes", then user can then specify an editing operation which will not require a change in the angle of slope of the selected line segment, and that editing operation is then executed.

If "fixed length" processing is not selected by the user, the system asks whether "fixed" processing is to be executed. This applies when the newly specified editing operation will affect a selected element such as a line segment or an apex point of a street block, or a landmark indication dot, If the answer is "yes", then the newly specified editing operation will not be executed, i.e. the selected element will be held in its current position and orientation.

If "fixed" processing is not selected by the user, the system asks whether "free" processing is to be executed. This applies when the newly specified editing operation will affect a selected element such as a line segment or landmark indication dot, or apex point of a street block. If the answer is "yes", then the newly specified editing operation is executed (after being checked and modified if necessary by the operation of the map conformity section 106a), irrespective of effects upon the results of previously executed editing.

It can thus be understood from the above and from the flow diagrams of FIGS. 6A. 6B. 6C and FIG. 7, that when the user initiates any transformation editing operation, the steps S1 to S5 of FIG. 6C are then executed. As a result, the effects of the newly specified editing operation are first checked by the map conformity section 106a, to ensure that no nonconformity (i.e., with this embodiment, no overlap type of nonconformity) will result, and the editing operation is then modified if necessary. The effects of the resultant editing operation are then checked by the transformation confirmation section 106d, for conflict with previously executed editing, and if conflict is found, the user is given an opportunity, through interactive dialog, to apply some limitation upon the proposed editing operation, to specify that the editing operation is to be executed without limitation, or to abandon the editing operation. Only after both of these types of checking have been correctly completed will the newly specified transformation editing operation, modified if necessary, actually be executed.

Figure 36:
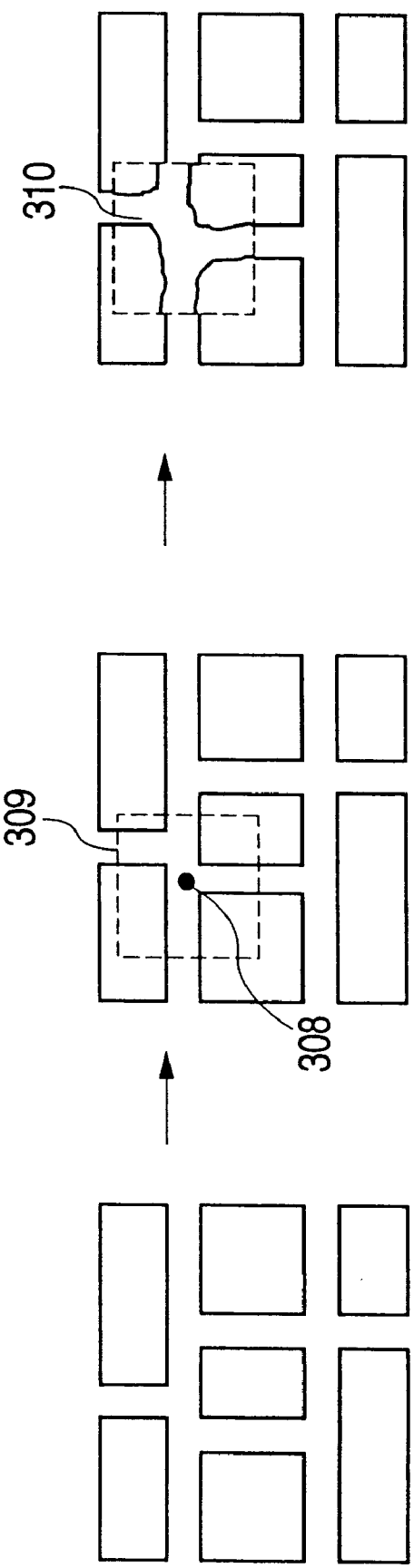
FIG. 36 illustrates, based on a portion of a displayed map, the effects of processing which is executed by an original picture generating section of the insertion picture generating section, whereby an original picture corresponding to a selected ground point is inserted into the map.

The expanded picture generating section 108a, birds-eye view picture generating section 108b and original picture generating section 108c of the insertion picture generating section 108 can be respectively used to generate an expanded picture as shown in FIG. 32, a birds-eye view picture as shown in FIG. 34, or an original picture as shown in FIG. 36, of a region of predetermined range surrounding a ground point which is arbitrarily selected by the user. The term "range" is used here to refer to a size-determining dimension of that region, e.g., the radius of a circular region.

In the example of FIG. 32, when the user selects a ground point within the displayed map, i.e. the ground point 300 in diagram (B), with the expanded picture generating section 108a activated, an expanded picture (i.e., expanded-size map portion) of a region having a predetermined range (indicated by the dotted-line outline 301) around the selected ground point is generated, with a predetermined degree of magnification. The expanded picture is then automatically set into the displayed map by the insertion picture generating section 108, at a location centered on the selected ground point, as shown in diagram (C).

Such an expanded picture can be generated either by using a method whereby data expressing a map having a larger scale than the map which is currently being displayed is read out from the map data base 102, and the appropriate region of that large-scale map is selected to be the expanded picture, or a method whereby the predetermined region around the selected ground point is directly magnified in size in the displayed map.

In that way, by predetermining the range in which an expanded picture will be displayed, and the degree of expansion that is to be applied to produce an expanded picture, it becomes possible for a user to set an expanded picture into a map simply by specifying an arbitrary ground point.

However it would be equally possible to configure the apparatus such that a user can utilize the expanded picture generating section to arbitrarily change the range and/or the degree of expansion that is to be applied to produce an expanded picture, rather than having these fixedly predetermined.

Figure 33:
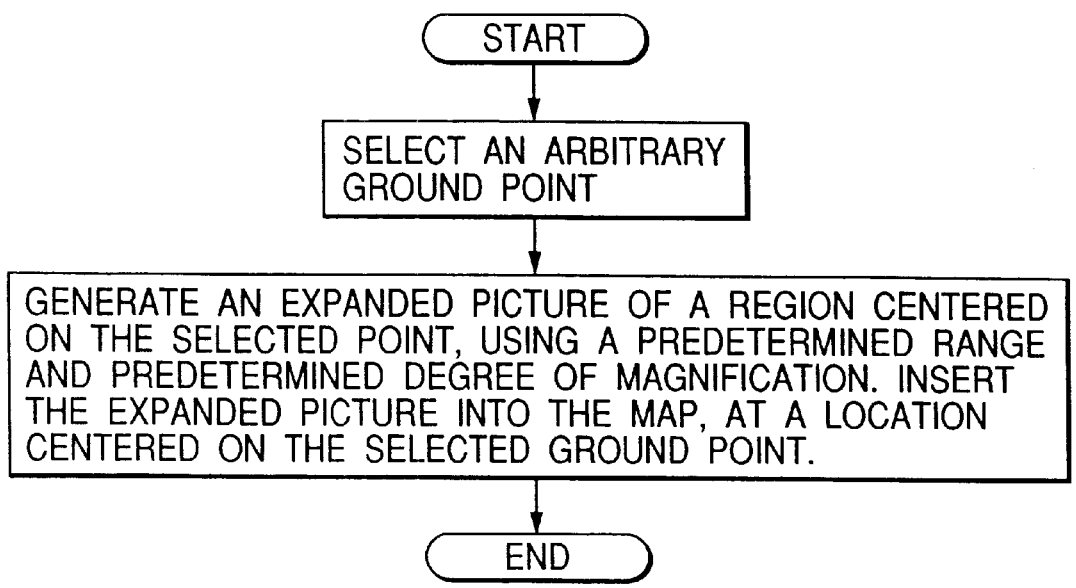
FIG. 33 is a basic flow diagram of the processing which is executed by the expanded picture generating section.

FIG. 33 is a simple flow diagram illustrating the processing which is executed to implement the above function of the expanded picture generating section 108a.

Referring to the example of FIG. 34, when the user selects a ground point within the displayed map, i.e. the ground point 303 in diagram (B), with the birds-eye view picture generating section 108b activated, a simple birds-eye view picture of region having a predetermined range (indicated by the dotted-line outline 304) surrounding the selected ground point is generated, using a predetermined visual point for generating the birds-eye view picture. In this example it is assumed that the predetermined visual point views the predetermined region 304 from a position at the center of the lower side of that region, i.e. looking towards the top of the displayed map. In addition, the birds-eye view picture is generated by reading out data concerning heights above sea level and information concerning heights of public buildings etc., for the predetermined region 304, from the map database 102. The birds-eye view picture thus generated is set into the displayed map at a location centered on the selected ground point 303, as shown in diagram (C) of FIG. 34.

In that way, by predetermining the range in which a birds-eye view picture will be displayed, and the position of the visual point that is to be used in generating the birds-eye view picture, it becomes possible for a user to set a birds-eye view picture into a map simply by specifying an arbitrary ground point.

However it would be equally possible to configure the apparatus such that a user can utilize the birds-eye view picture generating section to arbitrarily change the visual point.

Figure 35:
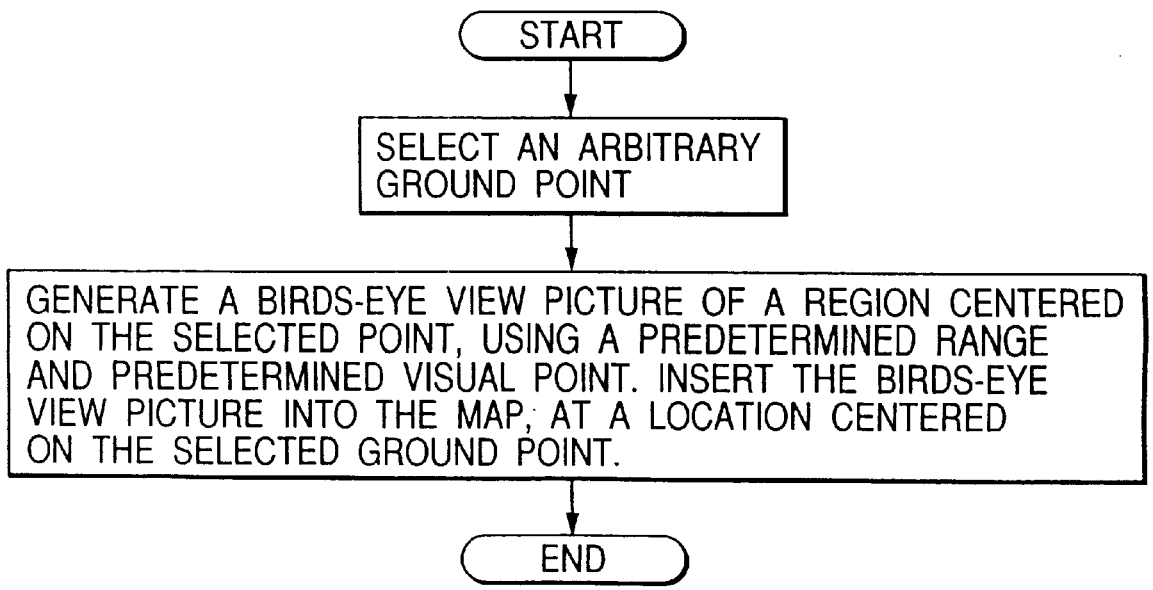
FIG. 35 is a basic flow diagram of the processing which is executed by the birds-eye view picture generating section.

FIG. 35 is a simple flow diagram illustrating the processing which is executed to implement the above function of the birds-eye view picture generating section 108b.

Referring to the example of FIG. 36, when the user selects a ground point within the displayed map, i.e. the ground point 308 in diagram (B) of FIG. 35, with the original picture generating section 108c activated, an original picture of a predetermined range surrounding that selected ground point (indicated by the dotted-line outline 309) is generated. The original picture is a portion of an original map (i.e. a map which has not yet been edited) corresponding to the selected ground point and the predetermined range, and is read out from the map database 102. The original picture thus generated is set into the displayed map at a location centered on a the selected ground point 308, as shown in diagram (C) of FIG. 36.

In that way, a user can easily set an original picture into a map, simply by specifying an arbitrary ground point. However it would be equally possible to configure the apparatus such that a user can utilize the original picture generating section original picture generating section 108c to arbitrarily change the range for which such an original picture will be generated.

Figure 37:
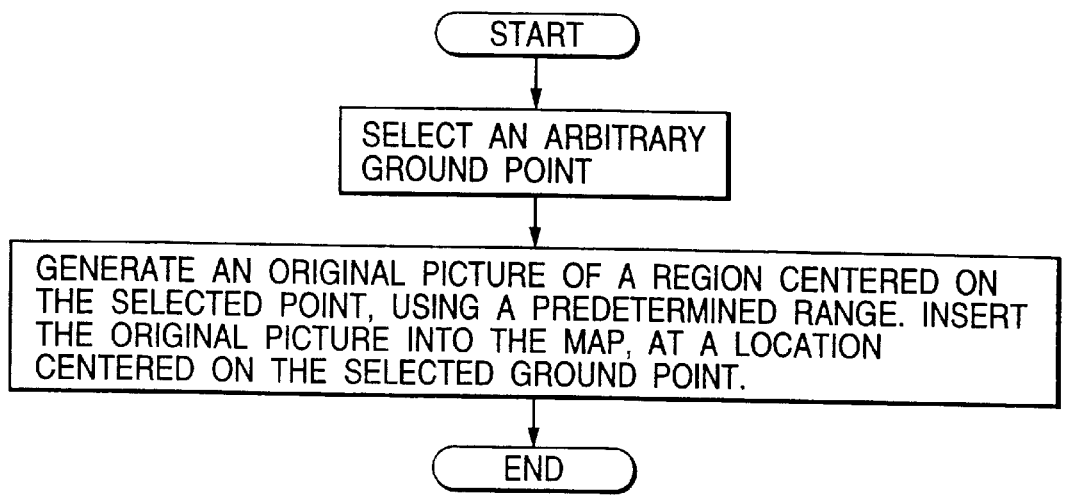
FIG. 37 is a basic flow diagram of the processing which is executed by the original picture generating section.

FIG. 37 is a simple flow diagram illustrating the processing which is executed to implement the function of the original picture generating section 108c.

The function of the extraction line generating section 108d of the insertion picture generating section 108 will be described in the following. This enables the user to specify that an insertion picture or a symbol or character string indicating an institution, is to be shifted to an arbitrarily selected position in the displayed map. When such a shift is executed, the extraction line generating section 108d automatically draws an an extraction line between the original region in which the picture, character string or symbol was located and the region to which it has been shifted. With this embodiment, the extraction line generating section 108d function such that the extraction line extends from a point in the original location, which is located on the opposite side from the shifted location, to the position of that point in the shifted location.

Figure 38:
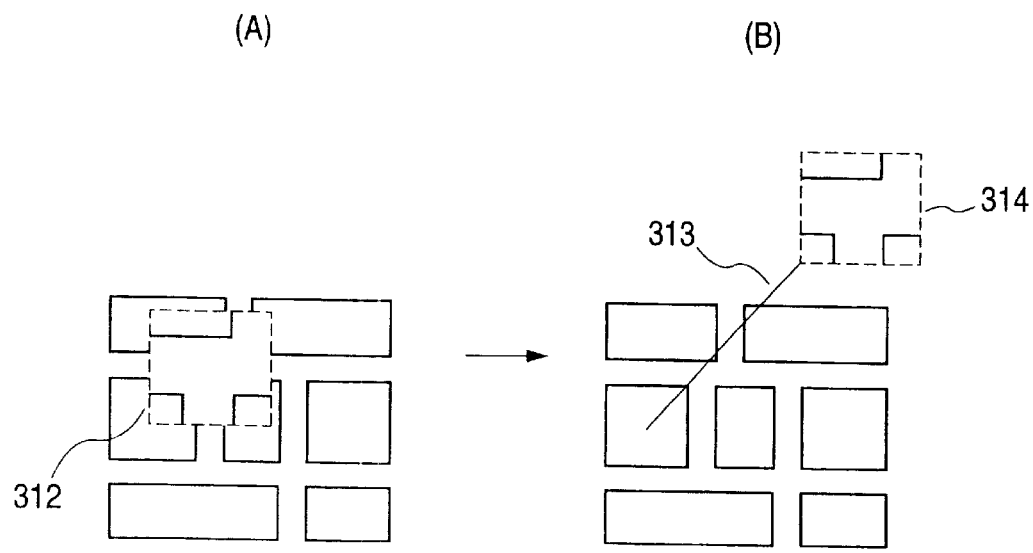
FIG. 38 illustrates, based on a portion of a displayed map, the effects of processing which is executed by an extraction line generating section of the insertion picture generating section, whereby an insertion picture is shifted from its initial location to a location centered on a selected ground point, and an extraction line is drawn from the original location to the shifted picture.

This process is illustrated in the example of FIG. 38, for the case of shifting an expanded picture. Here, the expanded picture shown in diagram (A) of FIG. 38 is shifted from its original region 312 in the displayed map to a region 314. To accomplish this, the user first selects the insertion picture which is to be shifted, then selects a ground point which will be the center of the shifted region 314, with the extraction line generating section 108d activated. The shift is then executed, and the extraction line 313 is drawn from the original region 312 to the shifted region 314 in which the expanded picture is located.

As illustrated in FIG. 38, the extraction line generating section 108d preferably generates such an extraction line as a line which extends from a point within the original location of the shifted region, postitioned on the opposite side of that region from the shifted region, to the corresponding point within the shifted region.

Figure 39:
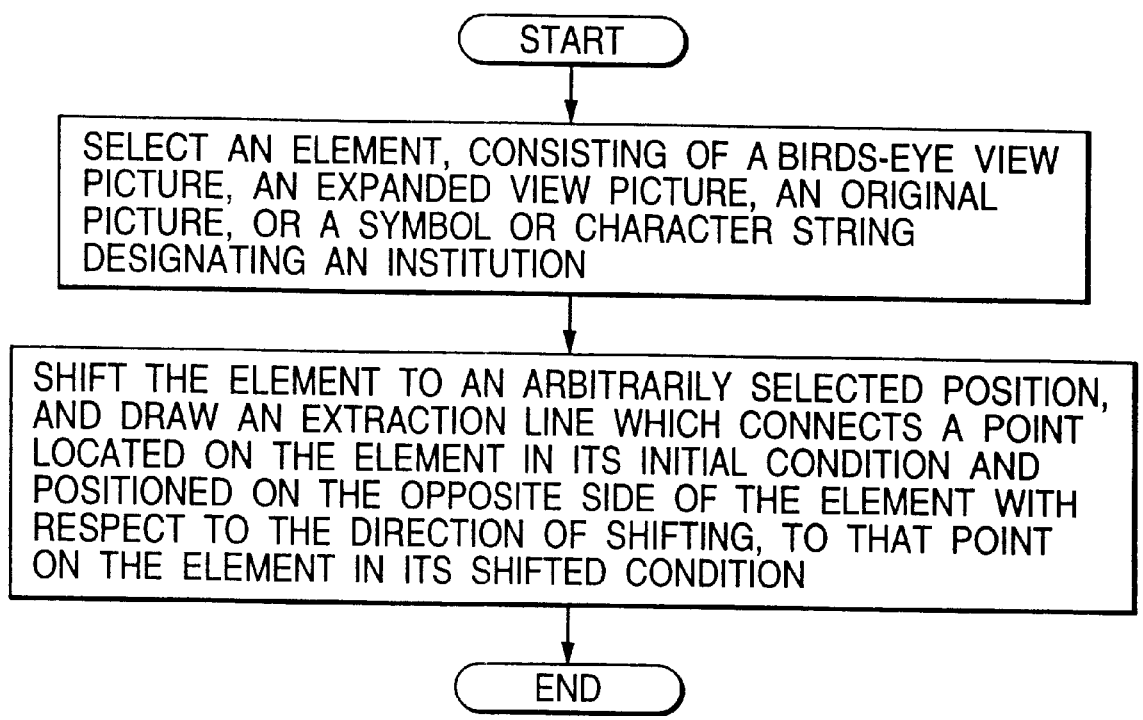
FIG. 39 is a basic flow diagram of the processing which is executed by the extraction line generating section.

FIG. 39 is a simple flow diagram illustrating the processing which is executed to implement the function of the extraction line generating section 108d.

The function of the street block aggregation section 109a of the aggregation section 109 is as follows. When the user selects a plurality of street blocks with the street block aggregation section 109a activated, a boundary is automatically drawn around the selected set of street blocks, and these are then combined into a single street block having that boundary.

However if the map conformity section 106a detects that the combined street block overlaps with another map element, i.e., conformity is not maintained, then the map conformity section 106a causes the street block aggregation section 109a to combine only a part of the selected plurality of street blocks into a single block, and the result is then judged to determine if conformity is maintained in the map. Such operations are repeated if necessary, using different parts of the selected plurality of street blocks, until a combined street block is obtained for which conformity is maintained in the map.

Figure 40:
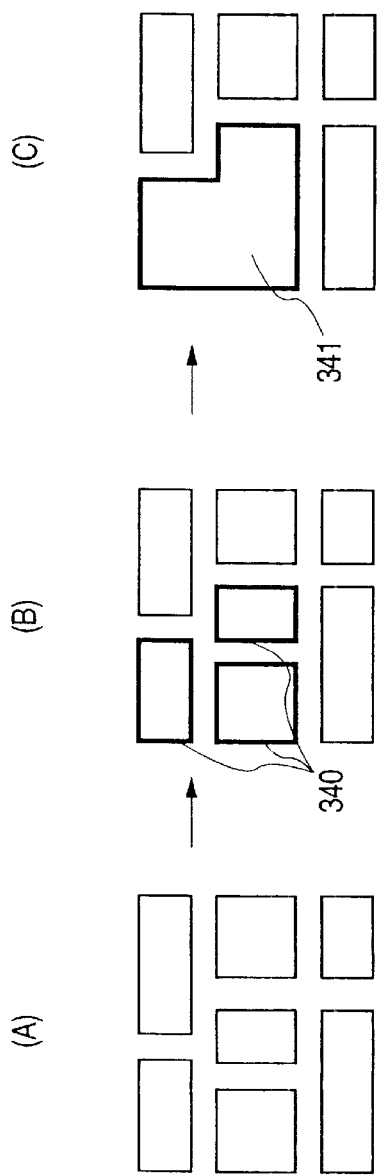
FIG. 40 illustrates, based on a portion of a displayed map, the effects of processing which is executed by a street block aggregation section, whereby a selected plurality of street blocks are combined into a single street block, for map simplification.

The operation of the street block aggregation section 109a is illustrated in the example of FIG. 40, in which the set of street blocks 340 are selected by the user, as shown in diagram (B), a boundary line of that set of street blocks is defined, and a single street block 341 is thereby formed, as shown in diagram (C) of FIG. 40.

Figure 42:
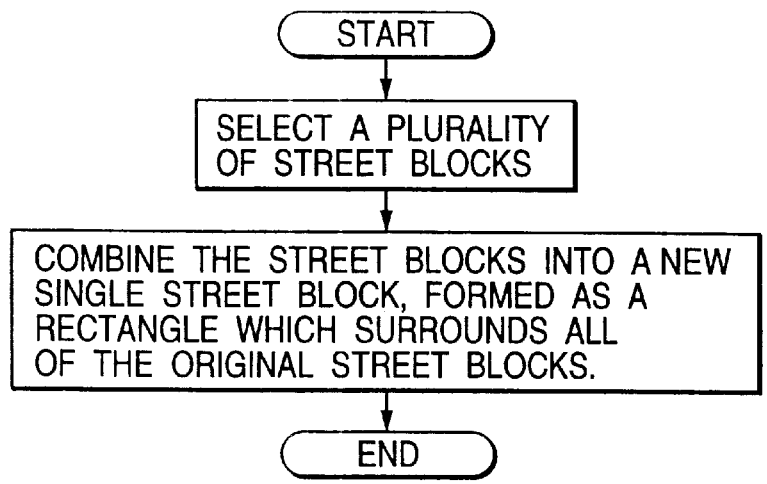
FIG. 42 is a basic flow diagram of the processing which is executed by the street block aggregation section.

FIG. 42 is a simple flow diagram illustrating the processing which is executed to implement the function of the street block aggregation section 109a.

The function of the railroad line aggregation section 109b of the aggregation section 109 is to operate on a plurality of railroad lines which are concentrated closely together within a region of the map, with a degree of concentration which exceeds a predetermined level. When activated, the railroad line aggregation section 109b automatically converts each of such sets of railroad lines into a single representative rl, which corresponds to a median line of the plurality of railroad lines. This function can be activated by the user, if desired, in order to simplify the displayed map.

Figure 41:
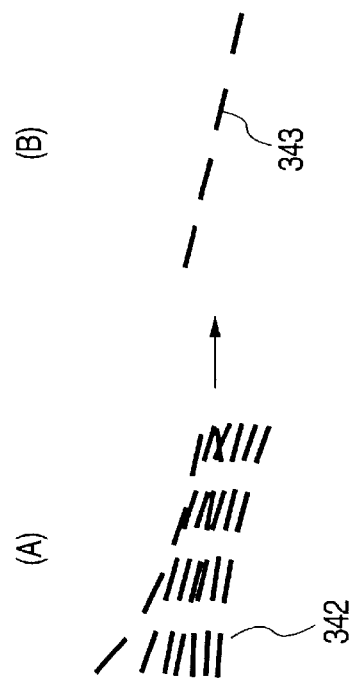
FIG. 41 illustrates, based on a portion of a displayed map, the effects of processing which is executed by a railroad line aggregation section, whereby a plurality of railroad lines are combined into a single representative railroad line, for map simplification.

This function of the railroad line aggregation section 109b is illustrated in FIG. 41. Here, a set of mutually adjacent railroad lines 342 shown in diagram (A), whose degree of concentration within the region shown exceeds the aforementioned predetermined level, are replaced by the single representative railroad line 343, as shown in diagram (B) of FIG. 41.

Figure 43:
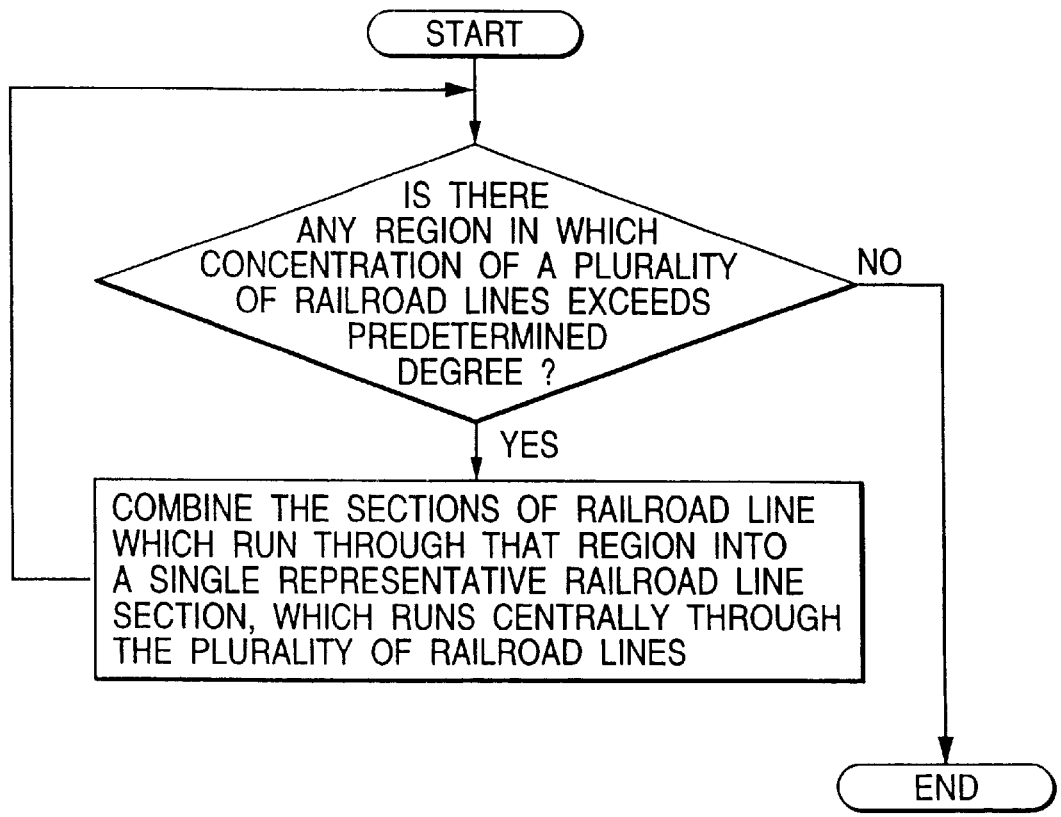
FIG. 43 is a basic flow diagram of the processing which is executed by the railroad line aggregation section.

FIG. 43 is a simple flow diagram showing the processing which is executed to implement the function of the railroad line aggregation section 109b.

Figure 44:
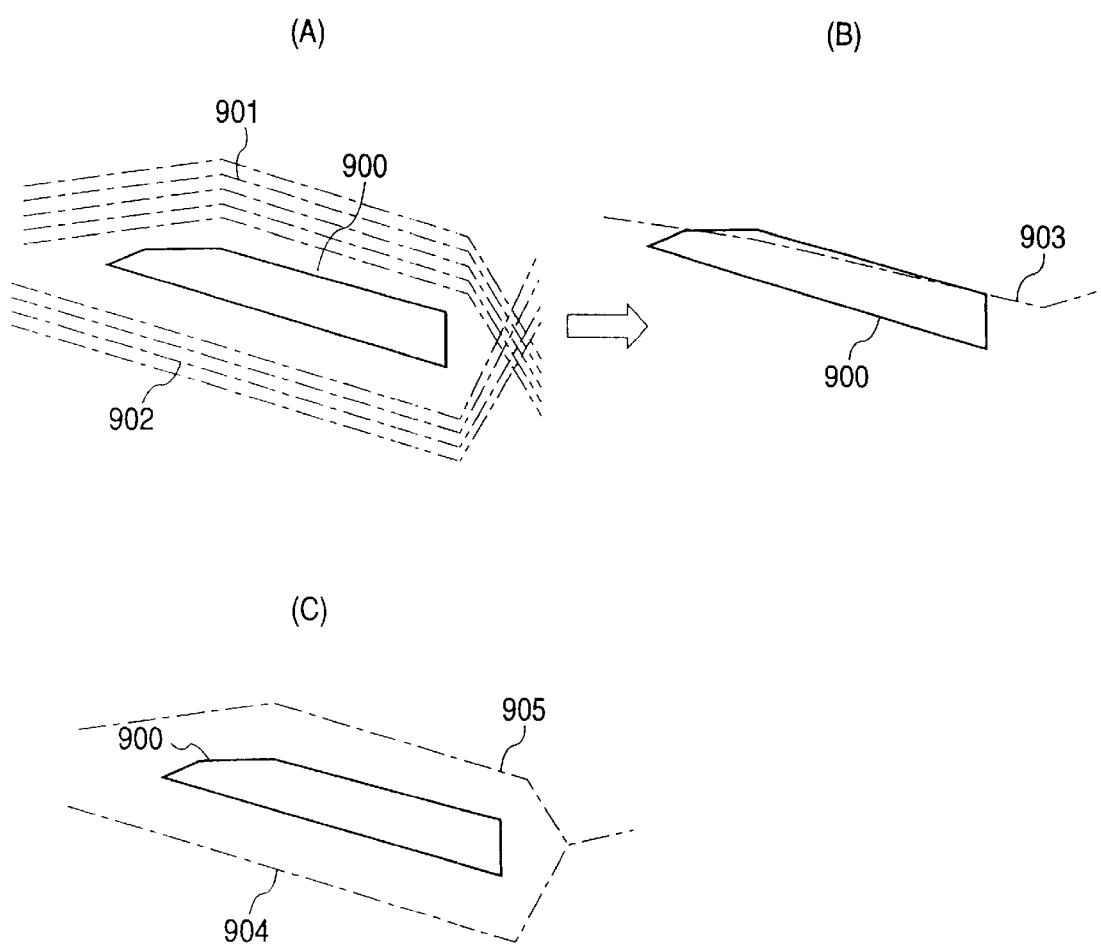
FIG. 44 illustrates the effects of control which is applied by the map conformity section of the conformity management section to the processing executed by the railroad line aggregation section, in the event that map nonconformity is caused by the operation of the railroad line aggregation section.

If it is found by the map conformity section 106a that nonconformity occurs in the displayed map as a result of such an operation, for example due to the combined line intersecting a street block, then the map conformity section 106a causes the railroad line aggregation section 109b to select two or more different parts of that set (i.e. running within two respectively different areas) to be converted into respective representative railroad line sections which will not cause nonconformity. This is illustrated in FIG. 44. Here, a plurality of railroad lines shown as 902 in diagram (A) are concentrated, in a certain region of the displayed map, with a sufficiently high density to be converted into a single representative railroad line by the railroad line aggregation section 109b. The railroad lines within the region of concentration consist of two groups, designated by numerals 901, 902, which pass on opposing sides of a street block 900. The result of the initial operation of the railroad line aggregation section 109b in this case is as shown in diagram (B). As shown in diagram (B), this results in a single representative railroad line 903 being formed in the displayed map to replace the railroad lines 901, 902. However this representative railroad line intersects the street block 900. This nonconformity is detected by the map conformity section 106a, which then causes the railroad line aggregation section 109b to subdivide the area of concentration of the railroad lines into a greater number of separate areas of concentration of railroad lines (i.e., initially two regions) and to combine the sets of railroad lines 900, 902 of these areas into respective representative railroad lines 904, 905, as shown in diagram (C). Overlapping with other map elements is thereby avoided, and conformity maintained in the map.

However if necessary, the area of concentration is divided into a greater number of smaller areas, and the above operations repeated until a condition is reached in which conformity is judged to be maintained, by the map conformity section 106a.

Although in the above description of the railroad line aggregation section 109b the function has been described, for brevity of description, as that of combining a plurality of railroad lines into a single representative railroad line, it will be understood that in general only certain sections of respective railroad lines will become closely concentrated together, in certain regions of a map. Hence, the function of the aggregation section 109 is actually to combine respective sections of mutually adjacent railroad lines into a representative railroad line section, in each region in which the degree of concentration exceeds the predetermined level.

The effects of the respective processing operations of the conformity management section 106, the portion transformation section 107, the insertion picture generating section 108 and the aggregation section 109 are displayed by the display apparatus 111.

Map editing can be performed in accordance with the requirements of the user by repetitions of applying the respective functions of the various sections of the apparatus described above. For example, a specific portion of a street can be widened if required, by successively applying the function of the street emphasizing section 107f, in conjunction with the function of the map transformation section 106c, to consecutive pairs of opposing street blocks in that street.

In addition, the user can control the data output section 112 to output either image data of maps or vector data of maps as the map data which are stored in the map data storage device 113, and the data thus stored can be used by various types of application. That is to say, the operation of the apparatus is not limited to only editing and displaying maps. An edited map whose data are stored in the map data storage device 113 can of course be re-edited subsequently if required.

With the present invention as described in the above, the following basic advantages are achieved. Firstly, due to the provision of the map conformity section, the result is achieved that when map editing is performed, the effects of such editing are monitored, and the editing operation is automatically modified if necessary such as to ensure that nonconformity due to overlapping of map elements will not occur map due to the editing.

Secondly, due to the provision of the right angle alignment section, the result is obtained that any two connected line segments which are selected by the user can be automatically arranged to meet at a right angle.

Thirdly, due to the provision of the curvature section, the result is obtained that any two connected line segments whose junction point is selected by the user can be automatically formed such as to meet along a curved line.

Fourthly, due to the provision of the parallel alignment section, the result is obtained that any two non-connected adjacent line segments which are selected by the user can be automatically arranged to become mutually parallel.

Fifthly, due to the provision of the line shortening section, the result is obtained that a line segment which selected by the user can be automatically shortened by a predetermined proportion of its length.

Sixthly, due to the provision of the straight line alignment section, the result is obtained that a plurality of successively connected line segments which are selected by the user can be automatically arranged in a straight line.

Seventhly, due to the provision of the street emphasizing section, the result is obtained that the spacing between two selected line segments which form constituent parts of respective adjacent street blocks can be increased, to thereby emphasize a street portion.

Eighthly, due to the provision of the street abridgement section, the result is obtained that the space between two selected line segments which form constituent parts of respective adjacent street blocks can be decreased, to thereby narrow a street portion.

Ninthly, due to the provision of the expanded picture generating section, the result is obtained that an expanded picture corresponding to a region of predetermined range surrounding an arbitrarily selected ground point of a map can be automatically set into the map, with a predetermined degree of expansion.

Tenthly, due to the provision of the birds-eye view picture generating section, the result is obtained that a birds-eye view picture corresponding to a region of predetermined range surrounding an arbitrarily selected ground point of a map, derived using a predetermined visual point, can be automatically set into the map.

Eleventhly, due to the provision of the original picture generating section, the result is obtained that an original picture corresponding a region of predetermined range surrounding an arbitrarily selected ground point of a map can be automatically set into that map.

Twelfthly, due to the provision of the extraction line generating section, the result is obtained that it becomes possible to shift an insertion picture, or a symbol or character string indicating a public building or other landmark, to an arbitrarily selected ground point, with an extraction line being automatically drawn in the map from the original location to the shifted location.

Thirteenthly, due to the provision of the map shifting section, the result is obtained that when shifting of two selected line segments in opposite directions is performed by the street emphasis section or by the street abridgement section and the map shifting section is set in operation, the map elements are divided along a median line from which the shifting is performed, all elements on one side of that line are shifted by the same amount and direction as the corresponding one of the two shifted line segments, while all elements on the other side of the median line are shifted by the same amount and direction as the corresponding shifted line segment. Conformity of position relationships is thereby throughout the map, in spite of the shifting of the selected line segments.

Fourteenthly, due to the provision of the map transformation section, the result is obtained that when shifting of two selected line segments in opposite directions is performed by the street emphasis section or by the street abridgement section with the map transformation section set in operation, each of respective street blocks having one of the shifted line segments as a constituent segment is compressed or expanded along the direction of shifting of that line segment, to thereby maintain conformity of position relationships between that street block and adjacent street blocks in the map.

Fifteenthly, due to the provision of the street block aggregation section, a selected plurality of street blocks can be combined into a single street block for the purpose of map simplification, while maintaining conformity of position relationships within the map.

Sixteenthly, due to the provision of the railroad line aggregation section, a plurality of sections of railroad line which are concentrated within a broad area can be combined into a single representative line, while maintaining conformity of position relationships within the map.

Seventeenthly, due to the provision of the transformation confirmation section, map data to which editing by transformation processing has been applied at least once is stored, and if subsequently a conflict arises between the effects of such editing on a specific element of a map and the effects of a newly specified transformation operation, the contents of the newly specified transformation processing are displayed on the display section by the display apparatus, and the system initiates an interactive dialog with the user to determine the form of processing which is to be executed. The user is thereby enabled to select between choices of abandoning the newly specified editing operation, modifying that editing operation in one of a plurality of predetermined ways, or executing the newly specified editing operation while ignoring the effects upon previously executed editing processing.

Thus with a map editing apparatus according to the present invention, having the respective sections which are described hereinabove, a map can easily be created in accordance with the desires of a user while maintaining conformity of position relationships within the map. In addition, expanded pictures or birds-eye view pictures can easily be set into the map. Moreover, street blocks or railroad lines can easily be simplified.

What is claimed is:

1. A map editing apparatus operable for generating a display image of a selected map and for editing said map, having a map readout means (105) for reading out map data expressing said map from an externally provided database (102), display means (110) for displaying said map on an externally provided display apparatus (111), and input means (104) for specifying elements to be selected in said map and for specifying editing operations which are to be applied to said selected elements, in response to input data and commands supplied from an externally provided input apparatus (101);

wherein said map editing apparatus comprises means (109, 107) operable for executing transformation editing operations on selected elements of said map and conformity management means (106) having map conformity means (106a) for monitoring the effects of a transformation editing operation upon existing position relationships in said map, and for automatically modifying said transformation editing operation such as to prevent occurrence of nonconformity of said position relationships due to effects of said transformation editing operation.

2. The map editing apparatus according to claim 1, comprising portion transformation means (107) including right angle alignment means (107a) operable for selecting two connected line segments and for automatically arranging said line segments to meet at a right angle.

3. The map editing apparatus according to claim 1, comprising portion transformation means (107) including curvature formation means (107b) operable for selecting a junction point of two connected line segments and for automatically effecting curvature of said line segments such that said line segments meet along a curved line which is an arc of a circle having a diameter that is equal to a distance between respective mid-points of said connected line segments.

4. The map editing apparatus according to claim 1, comprising portion transformation means (107) including parallel alignment means (107c) operable for selecting two mutually adjacent line segments and for automatically arranging said line segments to be mutually parallel.

5. The map editing apparatus according to claim 1, comprising portion transformation means (107) including line shortening means (107d) operable for selecting a single line segment and for automatically effecting shortening of said line segment by a predetermined proportion.

6. The map editing apparatus according to claim 1, comprising portion transformation means (107) including straight line alignment means (107e) operable for selecting a plurality of successively connected line segments and for automatically arranging said line segments into a single straight line formed of all of said line segments.

7. The map editing apparatus according to claim 1, comprising portion transformation means (107) including street emphasizing means (107f) operable for selecting two mutually adjacent line segments and for automatically increasing a distance between said line segments by a predetermined proportion.

8. The map editing apparatus according to claim 1, comprising portion transformation means (107) including street abridgement means (107g) operable for selecting two mutually adjacent line segments and for automatically reducing a distance between said line segments by a predetermined proportion.

9. The map editing apparatus according to claim 1, further comprising insertion picture generating means (108) including expanded picture generating means (108a) operable for selecting an arbitrary ground point in said map and for automatically setting into said map an expanded-size picture of a portion of said map which surrounds said ground point within a specific range, said expanded-size picture being set into a location which is centered on said ground point.

10. The map editing apparatus according to claim 9, wherein said expanded picture is generated using a predetermined range and using a predetermined degree of expansion to generate said expanded picture.

11. The map editing apparatus according to claim 9, wherein said expanded picture generating means is operable for arbitrarily selecting said range, and wherein a predetermined degree of expansion is used to generate said expanded picture.

12. The map editing apparatus according to claim 9, wherein said expanded picture generating means is operable for arbitrarily selecting a degree of expansion used to generate said expanded picture, and wherein said range is predetermined.

13. A map editing apparatus operable for generating a display image of a selected map of streets or transport routes and for editing said map, having map readout means for reading out map data expressing said map from a database, display means for displaying said map on an externally provided display apparatus, and input means for selecting specific elements of said map and for specifying editing operations which are to be applied to said elements, in accordance with input data and commands supplied from an externally provided input apparatus;

wherein said map editing apparatus comprises insertion picture generating means (108) including birds-eye view picture generating means (108b) operable for selecting an arbitrary ground point and for automatically setting into said map a birds-eye view picture of a portion of said map which surrounds that designated ground point within a specific range, said birds-eye view picture being set into a location which is centered on said ground point.

14. The map editing apparatus according to claim 13, wherein said birds-eye view picture is generated using a predetermined size of said range and using a predetermined visual point to generate said birds-eye view picture.

15. The map editing apparatus according to claim 13, wherein said birds-eye view picture generating means is operable for arbitrarily selecting said range, and wherein a predetermined visual point is used to generate said birds-eye view picture.

16. The map editing apparatus according to claim 13, wherein said birds-eye view picture generating means is operable for arbitrarily selecting a visual point which is used to generate said birds-eye view picture, and wherein said range is predetermined.

17. A map editing apparatus operable for generating a display image of a selected map of streets or transport routes and for editing said map, having map readout means for reading out map data expressing said map from a database, display means for displaying said map on an externally provided display apparatus, and input means for selecting specific elements of said map and for specifying editing operations which are to be applied to said elements, in accordance with input data and commands supplied from an externally provided input apparatus;

wherein said map editing apparatus comprises insertion picture generating means (108) including original picture generating means (108c) operable for selecting an arbitrary ground point, and for automatically setting into said displayed map an original picture of a portion of said map which surrounds that selected ground point within a specific range, said original picture being set into a location which is centered on said ground point.

18. The map editing apparatus according to claim 17, wherein said original picture is generated using a predetermined range.

19. The map editing apparatus according to claim 17, wherein said original picture generating means is operable for arbitrarily selecting said range.

20. The map editing apparatus according to claim 17, wherein said original picture generating means is operable for arbitrarily selecting a visual point which is used to generate said original picture, and wherein said range is predetermined.

21. A map editing apparatus operable for generating a display image of a selected map of streets or transport routes and for editing said map, having map readout means for reading out map data expressing said map from a database, display means for displaying said map on an externally provided display apparatus, and input means for selecting specific elements of said map and for specifying editing operations which are to be applied to said elements, in accordance with input data and commands supplied from an externally provided input apparatus;

wherein said map editing apparatus comprises insertion picture generating means (108) operable for selecting a first arbitrary ground point of said map and for generating an insertion picture and automatically setting said insertion picture into said map, and wherein said insertion picture generating means comprises extraction line generating means (108d) operable for selecting an insertion picture, a character string or a symbol in said map and for selecting an arbitrary ground point to which said selected insertion picture, character string or symbol is to be shifted, automatically executing shifting of said selected insertion picture, character string or symbol from an initial location thereof to a shifted location which is centered on said arbitrary ground point, and automatically generating an extraction line extending from a point at said initial location to a point at said shifted location.

22. The map editing apparatus according to claim 21, wherein said extraction line is drawn from a point which is positioned at an opposite side of said initial location from said shifted location, to a corresponding position of said point in said shifted location.

23. The map editing apparatus according to claim 1, comprising street emphasizing means (107f) operable for selecting a pair of mutually adjacent line segments and for increasing a distance between said line segments by a predetermined proportion through shifting of said line segments in opposite directions with respect to a median line, and street abridgement means operable for selecting a pair of mutually adjacent line segments and for reducing a distance between said line segments by a predetermined proportion, through shifting of said line segments in opposite directions with respect to a median line, wherein said conformity management means includes map shifting means operable when a shift operation has been executed by said street enhancement means or by said street abridgement means and when said selected pair of line segments are respective opposing constituent segments of two street blocks, for dividing all elements of said map other than said selected pair of line segments into a first set of elements which are located on a first side of said median line and a second set of elements which are located on a second side of said median line, and for automatically shifting each of said first set of elements and said second set of elements by an amount and direction of shifting which are identical to those applied to a corresponding one of said selected pair of line segments, to thereby maintain conformity of position relationships throughout said map.

24. The map editing apparatus according to claim 1, comprising street emphasizing means (107f) operable for selecting a pair of mutually adjacent line segments and for increasing a distance between said line segments by a predetermined proportion through shifting of said line segments in opposite directions with respect to a median line, and street abridgement means (107g) operable for selecting a pair of mutually adjacent line segments and for reducing a distance between said line segments by a predetermined proportion, through shifting of said line segments in opposite directions with respect to a median line, wherein said conformity management means includes map transformation means (106d) operable when a shift operation has been executed by said street emphasizing means or by said street abridgement means and when said selected pair of line segments are respective opposing constituent segments of two street blocks, for automatically compressing or expanding each of said street blocks along a direction in which a constituent one of said pair of line segments has been shifted, such as to maintain conformity of position relationships in said map.

25. The map editing apparatus according to claim 24, wherein said compression or expansion of a street block is executed by holding one apex point of said street block as a fixed reference apex point while shifting remaining apex points of said street block by respective proportions which are determined in accordance with distance from said corresponding one of said selected pair of line segments, said fixed reference apex point being selected as a farthest apex point from said corresponding one of said selected pair of line segments.

26. The map editing apparatus according to claim 1, comprising street block aggregation means (109a) operable for selecting a plurality of street blocks and automatically combining said street blocks into a single street block.

27. The map editing apparatus according to claim 26, wherein said street block aggregation means comprises means for automatically defining a boundary line around said plurality of street blocks and wherein said single street block is configured to correspond to said boundary line.

28. The map editing apparatus according to claim 1, comprising railroad line aggregation means (109b) operable for automatically combining into a single representative railroad line section a plurality of sections of respective railroad lines which are located in mutual proximity within a region of said map with a concentration which exceeds a predetermined degree.

29. The map editing apparatus according to claim 1 comprising portion transformation means (107) operable for selectively executing a plurality of transformation editing operations upon elements of said map, wherein said conformity management means (106) includes transformation confirmation means (106d) for maintaining a record of data expressing transformation operations applied to respective elements of said map by said portion transformation means (107), for detecting a condition in which execution of a newly specified transformation editing operation to be performed by said portion transformation means upon a map element will conflict with a previously executed transformation editing operation performed on said element, and for causing said display means to display a result of executing said newly specified transformation editing operation, by said display apparatus.

30. The map editing apparatus according to claim 29, wherein said transformation confirmation means causes said display means to display by said display apparatus a request for selection of one of a plurality of different courses of action which are to be taken, when said newly specified transformation editing operation for a map element is judged to conflict with a transformation editing operation previously executed on said map element.

31. The map editing apparatus according to claim 30, wherein when said map element is a line segment, said courses of action comprise:

holding one end of said line segment fixed in position, when a transformation editing operation is performed, holding said line segment fixed in length, when a transformation editing operation is performed, holding a slope angle of said line segment fixed, when a transformation editing operation is performed, holding said line segment in its current status, without executing a transformation editing operation which will affect that status, or freely executing a transformation editing operation, irrespective of effects upon said results of editing operations previously executed by said portion transformation means, and wherein when said map element is an apex point of a street block or is a position-indicating dot, said courses of action comprise:

holding said map element in its current position and orientation, or freely executing a transformation editing operation, irrespective of effects upon said results of editing operations previously executed by said portion transformation means, and wherein said effects of any transformation editing operation which is selected based on one of said courses of action are monitored by said map conformity means and said transformation editing operation is automatically modified by said map conformity means, if necessary, to prevent occurrence of nonconformity in said map due to said transformation editing operation.

32. A map editing apparatus operable for generating a display image of a selected map of streets or transport routes and for editing said map, having a map readout means (105) for reading out map data expressing said map from an externally provided database (102), display means (110) for displaying said map on an externally provided display apparatus (111), and input means (104) for specifying elements to be selected in said map and for specifying editing operations which are to be applied to said selected elements, in response to input data and commands supplied from an externally provided input apparatus (101);

wherein said map editing apparatus comprises means (109, 107) operable for executing transformation editing operations on selected elements of said map and conformity management means (106) having map conformity means (106a) for monitoring the effects of a transformation editing operation upon existing position relationships in said map, and for automatically modifying said transformation editing operation such as to prevent occurrence of nonconformity of said position relationships due to effects of said transformation editing operation.

\* \* \* \* \*